(12) United States Patent
Liang et al.

(10) Patent No.: US 12,373,088 B2
(45) Date of Patent: Jul. 29, 2025

(54) DISPLAY METHOD AND ELECTRONIC DEVICE

(71) Applicant: Huawei Technologies Co., Ltd., Shenzhen (CN)

(72) Inventors: Bing Liang, Shanghai (CN); Zhen Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 17/817,087

(22) Filed: Aug. 3, 2022

(65) Prior Publication Data

US 2022/0374118 A1 Nov. 24, 2022

Related U.S. Application Data

(63) Continuation of application No. PCT/CN2021/074694, filed on Feb. 1, 2021.

(30) Foreign Application Priority Data

Feb. 4, 2020 (CN) .......................... 202010079955.6

(51) Int. Cl.
*G06F 3/0484* (2022.01)
*G06F 1/16* (2006.01)
*G06F 3/0481* (2022.01)
*G06F 3/0488* (2022.01)
*G06F 9/451* (2018.01)

(52) U.S. Cl.
CPC .......... *G06F 3/0484* (2013.01); *G06F 1/1616* (2013.01); *G06F 3/0481* (2013.01); *G06F 3/0488* (2013.01); *G06F 9/451* (2018.02)

(58) Field of Classification Search
CPC .... G06F 3/0484; G06F 1/1616; G06F 3/0481; G06F 3/0488; G06F 9/451; G06F 3/04817; G06F 2203/04803; G06F 3/04883; G06F 3/04886
See application file for complete search history.

(56) References Cited

U.S. PATENT DOCUMENTS

| 2012/0131479 | A1 | 5/2012 | Zimmer |
| 2012/0169768 | A1 | 7/2012 | Roth et al. |
| 2013/0321340 | A1* | 12/2013 | Seo ........................ G06F 1/1647 |
| | | | 345/174 |
| 2016/0313877 | A1* | 10/2016 | Ha ........................ G06F 3/04842 |

(Continued)

FOREIGN PATENT DOCUMENTS

| CN | 106371659 A | 2/2017 |
| CN | 106445295 A | 2/2017 |

(Continued)

*Primary Examiner* — Cao H Nguyen
(74) *Attorney, Agent, or Firm* — SLATER MATSIL, LLP

(57) ABSTRACT

A display method and an electronic device are applied to an electronic device having a display. The method includes: displaying a first interface of a first application; detecting a first operation of a user; displaying, in response to the first operation, the first interface in a first area of the display, and displaying a second interface in a second area of the display; detecting a second operation of the user; and saving, in response to the second operation, a first image corresponding to the first interface, and displaying a thumbnail of the first image on the second interface.

20 Claims, 36 Drawing Sheets

(56) References Cited

U.S. PATENT DOCUMENTS

| | | | |
|---|---|---|---|
| 2018/0046341 A1 | 2/2018 | Lee et al. | |
| 2018/0129459 A1* | 5/2018 | Sylvan | G06F 3/1423 |
| 2019/0079666 A1 | 3/2019 | Li | |
| 2019/0147026 A1 | 5/2019 | Jon et al. | |
| 2019/0339855 A1* | 11/2019 | Walkin | G06F 3/0485 |
| 2022/0164152 A1* | 5/2022 | Sepulveda | G06F 3/04883 |

FOREIGN PATENT DOCUMENTS

| | | |
|---|---|---|
| CN | 106874046 A | 6/2017 |
| CN | 107066171 A | 8/2017 |
| CN | 107734148 A | 2/2018 |
| CN | 108055572 A | 5/2018 |
| CN | 108259973 A | 7/2018 |
| CN | 109189534 A | 1/2019 |
| CN | 109407936 A | 3/2019 |
| CN | 109683777 A | 4/2019 |
| CN | 109710127 A | 5/2019 |
| CN | 110032327 A | 7/2019 |
| CN | 110069228 A | 7/2019 |
| CN | 109271081 B | 9/2019 |
| CN | 110597612 A | 12/2019 |
| CN | 110704004 A | 1/2020 |
| CN | 111338519 A | 6/2020 |
| CN | 110109593 B | 4/2021 |
| CN | 110658971 B | 4/2021 |
| EP | 3800537 A1 | 4/2021 |
| EP | 3964935 A1 | 3/2022 |
| EP | 4024186 A1 | 7/2022 |

\* cited by examiner

TO

TO

CONT.
FROM

TO

TO

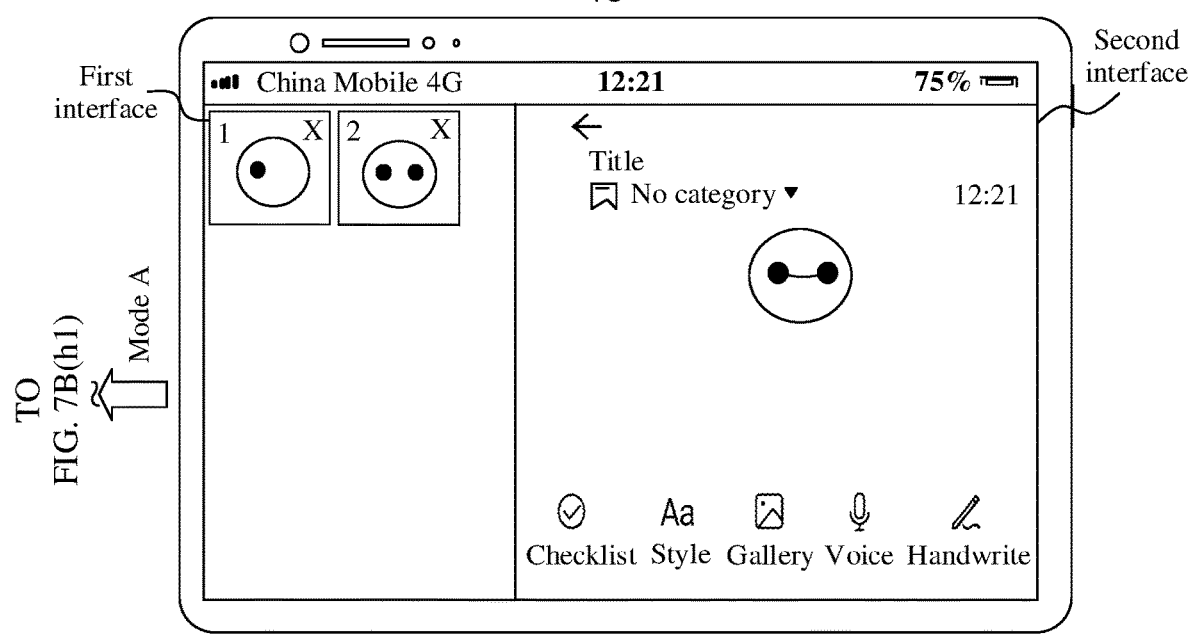
FIG. 7B(g)
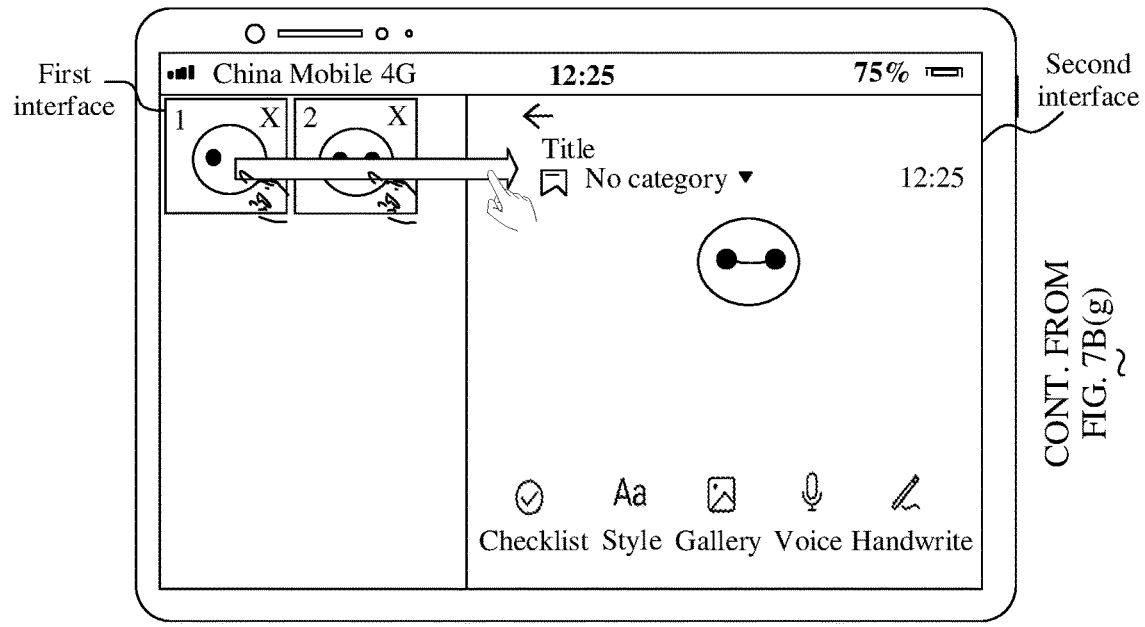
FIG. 7B(h1)

FIG. 7C(h2)

DISPLAY METHOD AND ELECTRONIC DEVICE

CROSS-REFERENCE TO RELATED APPLICATIONS

This application is a continuation of International Application No. PCT/CN2021/074694, filed on Feb. 1, 2021, which claims priority to Chinese Patent Application No. 202010079955.6, filed on Feb. 4, 2020. The disclosures of the aforementioned applications are hereby incorporated by reference in their entireties.

TECHNICAL FIELD

This application relates to the field of terminal technologies, and in particular, to a display method and an electronic device.

BACKGROUND

To improve visual experience, screens of various electronic devices become larger. For a large-screen electronic device, a screen of the electronic device may be usually divided into two areas, so that a user can compare content in the two areas.

Currently, a user may simultaneously display windows of two applications on an electronic device by using a split-screen mode provided by the electronic device, so as to compare content of the two applications. For example, when reading an abstract of a document, the user may take a screenshot of abstract content on a current page through a gesture operation. After the screenshot is taken, if the user wants to continue to read the rest of the document by reference to the abstract, the user needs to trigger by a gesture to enter a split-screen mode, and then the user needs to tap a gallery in the split-screen mode to find the screenshot of the abstract in the gallery. This implements comparative browsing of the document. However, an operation process of the foregoing method is complex.

SUMMARY

This application provides a display method and an electronic device, to simplify operation steps for implementing comparative browsing, and improve operation efficiency and user experience.

According to a first aspect, the present invention provides a display method that can be applied to an electronic device having a display. The method includes: displaying a first interface of a first application; detecting a first operation of a user; displaying, in response to the first operation, the first interface in a first area of the display, and displaying a second interface in a second area of the display; detecting a second operation of the user; and saving, in response to the second operation, a first image corresponding to the first interface, and displaying a thumbnail of the first image on the second interface.

In this application, an interface of an application A is displayed on the display of the electronic device, and then the display of the electronic device may be divided into two areas through the first operation of the user. In other words, the first operation may enable a working mode in which the display is divided into two display areas. After the mode is enabled, the display of the electronic device may display an interface 1 and an interface 2. For example, the interface 2 is an interface of the application A displayed before the mode is enabled. Then, the electronic device may save, in response to an operation of the user on the interface 2, an image corresponding to the interface 2, and display the image of the interface 2 on the interface 1 in a thumbnail form. In this way, the user can directly compare the thumbnail on the interface 2 with the thumbnail on the interface 1, without a need of opening a gallery to find the thumbnail. This can improve operation efficiency of the user, and improve user experience.

It should be noted that, in scenarios such as drawing or reading a document, a user usually needs to compare two interfaces for ease of operation or browsing. Therefore, in this application, when some application programs closely related to the foregoing scenarios are used, for example, some office software, drawing software, and game software, the mode needs to be enabled, so as to compare the two interfaces. This facilitates user operations. Certainly, it may be understood that the mode may also be applied to another application program. This is not limited in this application.

In a possible implementation, a text description corresponding to the thumbnail of the first image is further displayed on the second interface.

In the foregoing technical solution, the text description corresponding to the thumbnail of the first image may be further displayed on the second interface, so that the user can clearly understand content corresponding to the thumbnail. This facilitates a subsequent operation of the user and improves user experience.

In a possible implementation, the method further includes: detecting a third operation performed on the thumbnail of the first image, and displaying the first image in the second area.

In the foregoing technical solution, when the third operation performed by the user on the thumbnail of the first image is detected, the second area may display the first image. This can facilitate comparative browsing by the user.

For example, the user may tap the thumbnail of the first image, to display the thumbnail of the first image in full screen on the second interface, or the user may display the thumbnail of the first image in full screen on the second interface through a gesture extension operation. In this way, when the user continues to operate on the first interface, the user may operate by reference to the thumbnail displayed in full screen on the second interface.

In a possible implementation, the method further includes: saving, in response to the second operation, the first progress corresponding to the first image.

It should be noted that the first image is an image saved when a user operation on the first interface reaches the first progress.

In this technical solution, the electronic device may save, in response to the user operation, the progress corresponding to the first image on the first interface. This may help the user compare the progress on the second interface with the progress on the first interface when operating on the first interface, so that adjustment can be performed in a timely manner when required.

Certainly, it may be understood that when saving the first image corresponding to the first interface, the user may save all content in the first interface, or may save only key information in the first interface. For example, when the user draws a picture in the first interface, the key information in the first interface may be understood as a pattern formed by each operation performed by the user in the first interface, that is, a progress of drawing the picture in the first interface by the user.

In a possible implementation, after the displaying the first image in the second area, the method further includes: detecting a fourth operation performed on the first interface; displaying, in response to the fourth operation, a third interface in the first area of the display, where an image corresponding to the third interface is a second image, the second image is a corresponding image when the user operation on the first interface reaches a second progress, and the second progress is a progress after the first progress; detecting a fifth operation performed on the first image; and displaying, in response to the fifth operation, the first image in the first area of the display.

That is, after the second area displays the first image, the user may continue to operate on the first interface. For example, the user may perform a next operation on the first image, to form an updated image. Because the updated image is an image formed after a next operation is performed on the first image, it may be understood that a progress of the updated image is a progress after the progress of the first image. If the user feels dissatisfied with the updated image, and wants to restart an operation from the first image, the electronic device may restore, in response to the fifth operation performed by the user on the first image, the current image progress to the progress of the first image. In this case, the user can perform an operation from the progress of the first image. This improves user experience.

For example, it is assumed that the user draws a picture on the first interface by using a drawing application, the first image is displayed on the first interface, the progress of the first image is recorded as a progress 1, and then the progress 1 is saved on the second interface. The user may continue to draw a picture on the first interface. For example, the user continues to draw by two steps based on the progress of the first image to form the second image. For example, the progress of the second image may be recorded as a progress 2. In this case, if the user wants to draw again from the progress 1, an operation may be performed on a thumbnail of the progress 1 displayed on the second interface, and the first image corresponding to the thumbnail of the progress 1 is restored to the first interface. In this way, the user can save and restore the progress at any time. Therefore, user experience may be improved.

In a possible implementation, the first operation includes an operation of enabling a preset working mode from a notification bar of the display. It should be noted that the preset working mode is denoted as a "dual-screen linkage mode" in this application.

In this application, the user may enable the preset working mode in a plurality of manners, so that the display is divided into two display areas. For example, the dual-screen linkage mode may be enabled through a status bar, a voice instruction, or a "settings" interface. In other words, the display is divided into two display areas. The first area displays the first interface, and the second area displays the second interface. It should be noted that after the mode is enabled, one area of the display displays an operation instruction of the mode, and the other area may display a home screen of the electronic device, an interface of the electronic device before the mode is enabled, or the like.

In an example, the user may open the status bar by sliding down the status bar, for example, from the top of the display, to enable the dual-screen linkage mode through a switch in the status bar. In still another example, the user may alternatively wake up the dual-screen linkage mode through a voice, for example, wake up a voice assistant by saying "xiaoyi xiaoyi", and then enter "please help me enable the dual-screen linkage mode" in the voice assistant. Then, the electronic device may enable, in response to the voice instruction, the dual-screen linkage mode. It may be understood that the foregoing example is merely an example for description, and this is not limited in this application.

In a possible implementation, the second operation includes: a top-down slide operation in the first area, or a bottom-up slide operation in the first area.

It should be noted that a location relationship between the first area and the second area is not limited in this application. For example, the first area may be located on a left side of the second area, or the first area may be located on a right side of the second area.

For example, it is assumed that the user saves content in the first interface, and the first interface is located on the right side of the second interface, the user may save the content in the first interface by performing the top-down slide operation along a right edge of the display or the bottom-up slide operation along a right edge of the display. Certainly, it may be understood that, when the content in the first interface is saved, all content in the first interface may be saved, or some content in the first interface may be saved.

In a possible implementation, the third operation includes a tap operation and a gesture extension operation.

In this application, the user may display, in full screen on the second interface through the tap operation or the gesture extension operation, the thumbnail displayed on the second interface. Certainly, a gesture operation of displaying the thumbnail in full screen on the second interface is not limited to the foregoing example. Any gesture operation of displaying the thumbnail in full screen may be included in this application. This is not limited herein.

In a possible implementation, the fifth operation includes a slide operation from the second area to the first area.

For example, the user may slide the thumbnail on the second interface from left to right. When the thumbnail slides to an edge of the first interface or a position with a specific distance from the edge of the first interface, the electronic device may restore an image corresponding to the thumbnail to the first interface.

In a possible implementation, the second interface is further configured to display an operation instruction of a preset working mode. The operation instruction of the preset working mode includes at least one of function descriptions corresponding to the first operation, the second operation, the third operation, and the fifth operation respectively.

In this application, after the user performs the first operation, the second interface on the display may display the operation instruction of the preset working mode. The first operation may be understood as enabling the preset working mode. The operation instruction of the preset working mode may include: how to enable the mode, how to disable the mode, how to take a screenshot in the mode, how to save a progress, how to delete a thumbnail, or the like. The user may perform a corresponding operation according to the operation instruction of the mode.

For example, the second operation may be used to save the first image corresponding to the first interface or save the first progress corresponding to the first image. In the operation instruction of the preset working mode, a function description corresponding to the second operation may be: sliding from top to bottom to take a screenshot, or sliding from bottom to top to save a progress. Certainly, it may be understood that the screenshot may be understood as saving the first image corresponding to the first interface.

In a possible implementation, when the display is a foldable display, the first interface of the first application is displayed on a primary screen of the foldable display, and the second interface of a second application is displayed on a secondary screen of the foldable display.

In this application, when the display is the foldable display, for example, the display may be divided into a primary screen and a secondary screen. The first interface of the first application may be displayed on the primary screen, and the second interface of the second application may be displayed on the secondary screen.

In a possible implementation, when the display is the foldable display, after the in response to the first operation, the method at least may include the following several cases.

A first case: displaying the first interface on the primary screen of the foldable display, and displaying the second interface and an operation instruction of a preset working mode on the secondary screen of the foldable display.

A second case: displaying the first interface and an operation instruction of a preset working mode on the primary screen of the foldable display, and displaying the second interface on the secondary screen of the foldable display.

A third case: displaying the first interface on the primary screen of the foldable display, and displaying an operation instruction of a preset working mode on the secondary screen of the foldable display.

A fourth case: displaying an operation instruction of a preset working mode on the primary screen of the foldable display, and displaying the second interface on the secondary screen of the foldable display.

It should be noted that when the display is the foldable display, a display mode is not limited to the foregoing four cases, the mode may alternatively be applied to both the primary screen and the secondary screen. This is not limited in this application.

According to a second aspect, this application further provides an electronic device. The electronic device includes a display, one or more processors, one or more memories, one or more sensors, a plurality of applications, and one or more computer programs. The one or more computer programs are stored in the one or more memories, and the one or more computer programs include instructions. When the instructions are invoked and executed by the one or more processors, the electronic device is enabled to perform the technical solution in any one of the first aspect or the possible designs of the first aspect in embodiments of this application.

According to a third aspect, this application further provides an electronic device. The electronic device includes modules/units that are configured to perform the method in the first aspect or any possible design of the first aspect. The modules/units may be implemented by hardware, or may be implemented by hardware by executing corresponding software.

According to a fourth aspect, an embodiment of this application further provides a chip. The chip is coupled to a memory in an electronic device, and performs the technical solution in any one of the first aspect or the possible designs of the first aspect in embodiments of this application. In this embodiment of this application, "coupling" means that two components are directly or indirectly connected to each other.

According to a fifth aspect, an embodiment of this application provides a computer readable storage medium. The computer readable storage medium includes a computer program. When the computer program is run on an electronic device, the electronic device is enabled to perform the technical solution in any one of the first aspect or the possible designs of the first aspect in embodiments of this application.

According to a sixth aspect, an embodiment of this application provides a computer program product. When the computer program product is run on an electronic device, the electronic device is enabled to perform the technical solution in any one of the first aspect or the possible designs of the first aspect in embodiments of this application.

BRIEF DESCRIPTION OF THE DRAWINGS

FIG. 5A-1 and FIG. 5A-2 are a schematic diagram of a settings interface of a dual-screen linkage mode according to an embodiment of this application;

FIG. 5B-1 to FIG. 5B-4 are a schematic diagram of a group of interfaces of a mobile phone 100 according to an embodiment of this application;

FIG. 5C-1 to FIG. 5C-3 to FIG. 5G-1 to FIG. 5G-3 each are a schematic diagram of an interface of a mobile phone 100 according to an embodiment of this application;

DETAILED DESCRIPTION OF ILLUSTRATIVE EMBODIMENTS

Technical solutions in embodiments of this application are described in detail below with reference to accompanying drawings of the following embodiments of this application.

In the following, some terms of embodiments of this application are described, to help a person skilled in the art have a better understanding.

An application (app) program in embodiments of this application may be referred to as an application for short, and is a software program that can implement one or more specific functions. Usually, a plurality of applications may be installed in the electronic device. For example, a camera application, a short message application, a mailbox application, WeChat, WhatsApp Messenger, Line, image sharing (instagram), Kakao Talk, DingTalk, and the like, may be installed in the electronic device. The application in the following embodiments may be an application installed before delivery of the electronic device, or may be an application downloaded from a network or obtained from another electronic device by a user in a process of using the electronic device.

It should be noted that the method provided in this embodiment of this application is applicable to an electronic device that has a display and that can divide the display into two areas for separate displaying, for example, a mobile phone, a tablet computer, a wearable device (for example, a watch, a wristband, or a smart helmet), a vehicle-mounted device, a smart home device, an augmented reality (AR) device/a virtual reality (VR) device, a notebook computer, an ultra-mobile personal computer (UMPC), a netbook, a personal digital assistant (PDA), or the like. This is not limited in this embodiment of this application. The electronic device in embodiments of this application may alternatively be a foldable electronic device, for example, a foldable mobile phone or a foldable tablet computer. This is not limited in this application.

The following uses the mobile phone as an example to describe the structure of the mobile phone.

Figure 1:
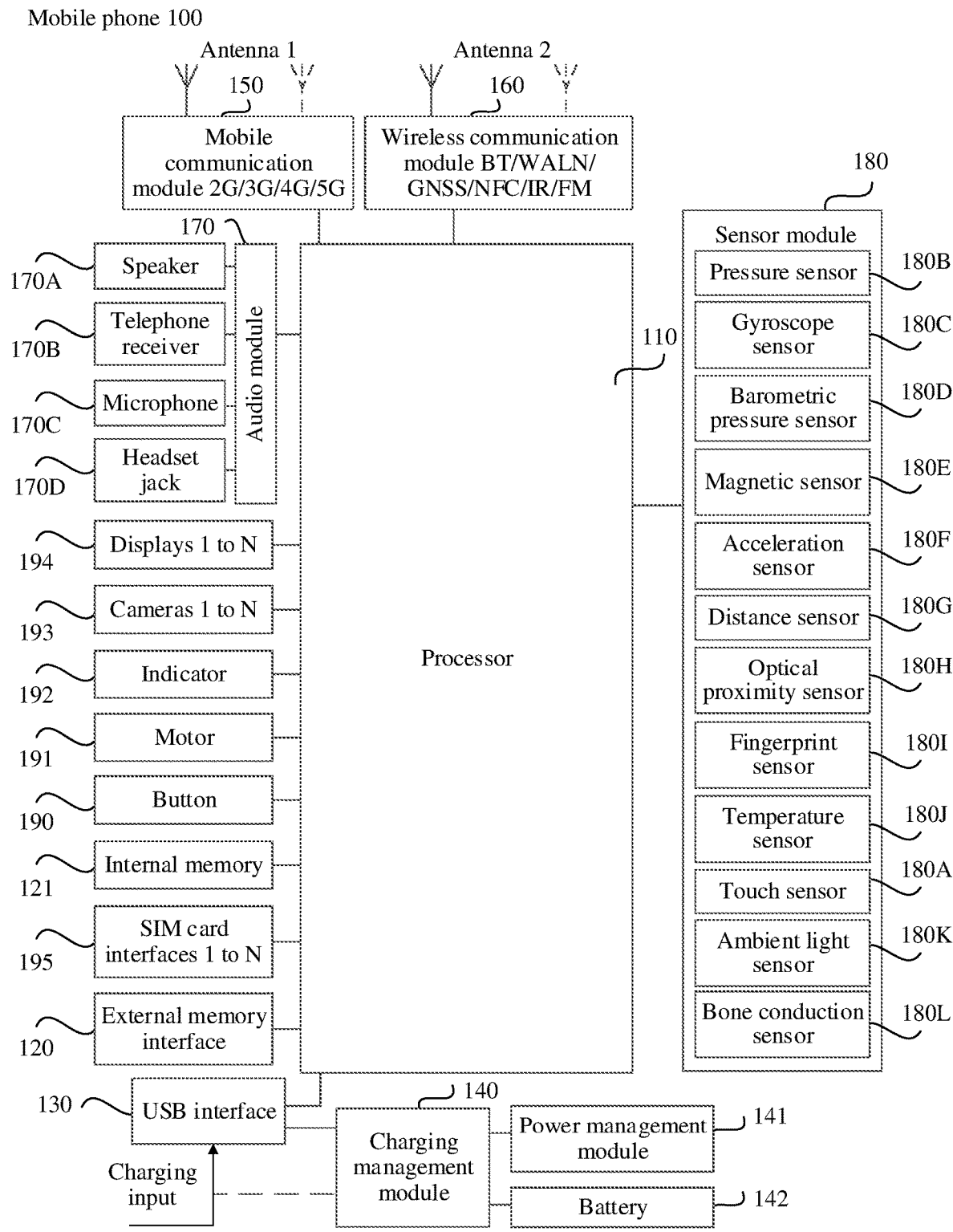
FIG. 1 is a structural diagram of hardware of a mobile phone 100 according to an embodiment of this application.

Specifically, as shown in FIG. 1, the mobile phone 100 includes a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 100. The controller may generate an operation control signal based on instruction operation code and a time sequence signal, to control instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

The USB interface 130 is an interface that conforms to a USB standard specification, and may be specifically a mini USB interface, a micro USB interface, a USB Type C interface, or the like. The USB interface 130 may be configured to connect to a charger to charge the mobile phone 100, or may be configured to transmit data between the mobile phone 100 and a peripheral device. The charging management module 140 is configured to receive a charging input from the charger. The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the mobile phone 100 may be implemented through the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the mobile phone 100 may be configured to cover one or more communication frequency bands. Different antennas may be further reused to improve utilization of the antennas. For example, the antenna 1 may be reused as a diversity antenna of a wireless local area network. In some other embodiments, the antenna may be used in combination with a tuning switch.

The mobile communication module 150 may provide a solution to wireless communication such as 2G/3G/4G/5G applied to the mobile phone 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules in the processor 110.

The wireless communication module 160 may provide a solution to wireless communication applied to the mobile phone 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communication module 150 of the mobile phone 100 are coupled, and the antenna 2 and the wireless communication module 160 are coupled, so that the mobile phone 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light emitting diode (QLED), or the like. In some embodiments, the mobile phone 100 may include one or N displays 194, where N is a positive integer greater than 1.

When the display 194 is a flexible screen, the user may fold the display 194. For example, refer to FIG. 2, after the user folds the display 194, the display 194 may be divided into two display areas: a display area 1 and a display area 2. In addition, there is an included angle β between the two display areas obtained by dividing the display 194. For ease of description, the display area 1 may be referred to as a primary screen of the mobile phone 100, and the display area 2 may be referred to as a secondary screen of the mobile phone 100. Display areas of the primary screen and the secondary screen may be the same or different.

It may be understood that the user may fold the screen along one or more folding lines in the display 194. A location of the folding line may be preset, or may be randomly selected by the user on the display 194.

In this application, when the included angle β between the primary screen and the secondary screen is greater than a threshold (for example, 170°), the mobile phone 100 may determine that the display 194 is in an expanded state. When the included angle β between the primary screen and the secondary screen is less than the threshold, the mobile phone 100 may determine that the display 194 is in a folded state. In this embodiment of this application, a physical form of the display 194 may be divided into only an expanded state and a non-expanded state.

The camera 193 is configured to capture a static image or a video. The camera 193 may include a front-facing camera and a rear-facing camera.

The internal memory 121 may be configured to store computer-executable program code, and the executable program code includes instructions. The processor 110 runs the instructions stored in the internal memory 121, to perform various function applications of the mobile phone 100 and data processing. The internal memory 121 may include a program storage area and a data storage area. The program storage area may store an operating system, software code of at least one application program (such as an iQIYI application or a WeChat application), and the like. The data storage area may store data (for example, an image and a video) and the like generated in a process of using the mobile phone 100. In addition, the internal memory 121 may include a high-speed random access memory, or may include a non-volatile memory, for example, at least one magnetic disk storage device, a flash memory, or a universal flash storage (UFS).

The external memory interface 120 may be configured to connect to an external storage card such as a micro SD card, to extend a storage capability of the mobile phone 100. The external memory card communicates with the processor 110 through the external memory interface 120, to implement a data storage function. For example, a file such as a picture or a video is stored in the external storage card.

The mobile phone 100 may implement an audio function such as music playing or recording through the audio module 170, the loudspeaker 170A, the telephone receiver 170B, the microphone 170C, the headset jack 170D, the application processor, and the like.

The touch sensor 180A is also referred to as a "touch panel". The touch sensor 180A may be disposed on the display 194, and the touch sensor 180A and the display 194 constitute a touchscreen, which is also referred to as a "touchscreen". The touch sensor 180A is configured to detect a touch operation performed on or near the touch sensor 180A. The touch sensor may transfer the detected touch operation to the application processor to determine a type of a touch event. The display 194 may provide a visual output related to the touch operation. In some other embodiments, the touch sensor 180A may be alternatively disposed on a surface of the mobile phone 100, and is located on a position different from that of the display 194.

It should be noted that the sensor in the mobile phone 100 may further include a pressure sensor 180B, a gyroscope sensor 180C, a barometric pressure sensor 180D, a magnetic sensor 180E, an acceleration sensor 180F, a distance sensor 180G, an optical proximity sensor 180H, a temperature sensor 180J, a bone conduction sensor 180L or the like. Certainly, the mobile phone 100 may further include a button 190 (for example, a power button, a volume button, and the like), a motor 191, an indicator 192, an SIM card interface 195, and the like.

It may be understood that the components shown in FIG. 1 do not constitute a specific limitation on a mobile phone. The mobile phone may further include more or fewer components than those shown in the figure, or some components may be combined, or some components may be split, or different component arrangements may be used. In the following embodiments, the mobile phone 100 shown in FIG. 1 is used as an example for description.

A software system of the mobile phone 100 may use a layered architecture, an event-driven architecture, a microkernel architecture, a microservice architecture, or a cloud architecture. In this embodiment of this application, an Android system with a layered architecture is used as an example to describe a software structure of the mobile phone 100.

Figure 3A:
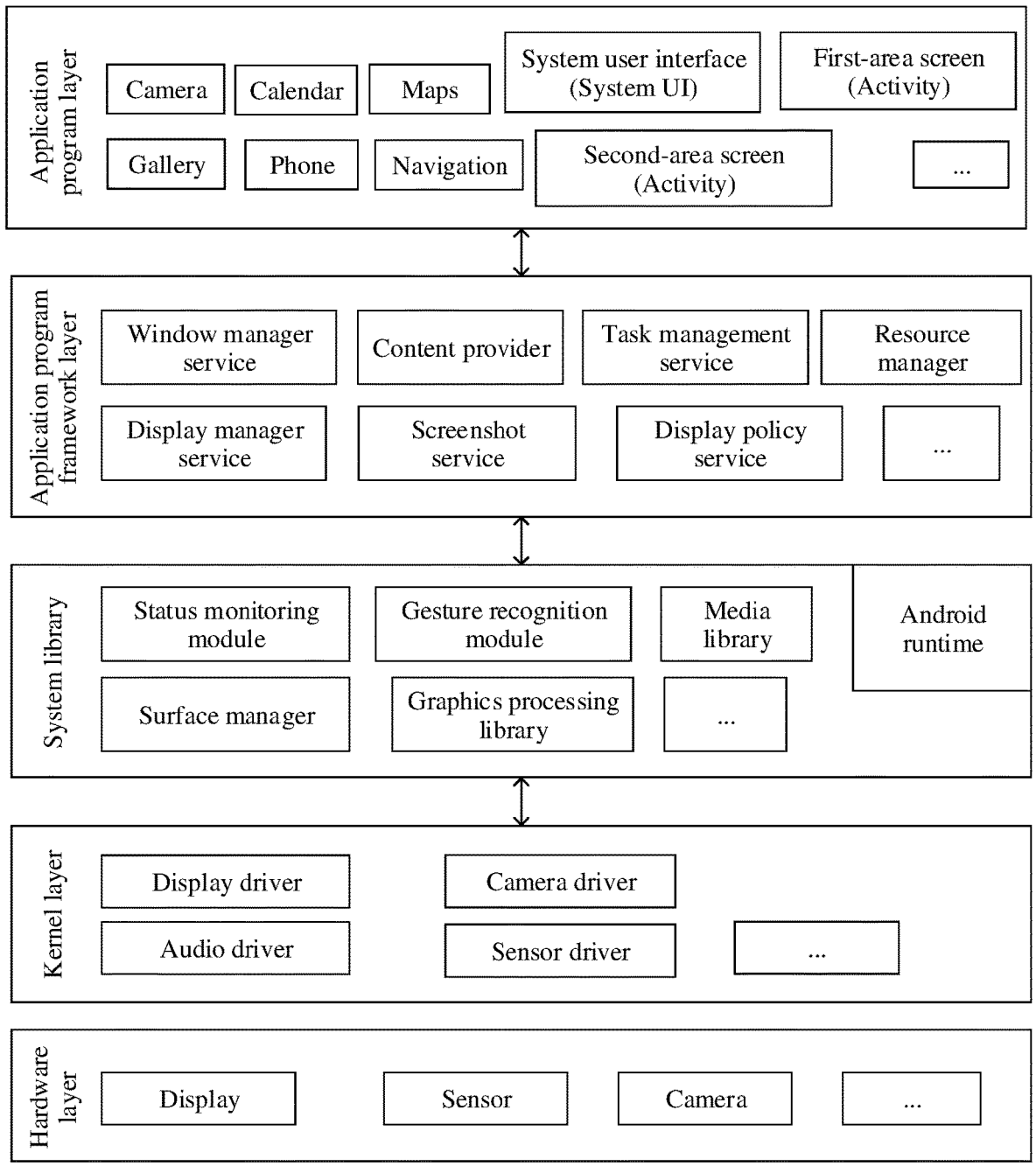
FIG. 3A is a schematic diagram of a software architecture according to an embodiment of this application.

FIG. 3A is a block diagram of a software structure of a mobile phone 100 according to an embodiment of this application. In the layered architecture, software is divided into several layers, and each layer has a clear role and task. The layers communicate with each other through a software interface. In some embodiments, the Android system is divided into four layers, namely, an application program layer, an application program framework layer, an Android runtime and system library, and a kernel layer from top to bottom.

The application program layer may include a series of application program packages. As shown in FIG. 3A, application programs such as Gallery, Calendar, Phone, Map, Navigation, a system UI, a first-area activity, a second-area activity, and the like may be installed in the application program layer.

The application framework layer provides an application programming interface (API) and a programming framework for an application at the application layer. The application program framework layer includes some predefined functions.

As shown in FIG. 3A, the application program framework layer may include a display policy service, a screenshot service, and a display manager service (DMS). Certainly, the application program framework layer may further include an activity manager, a window manager service (WMS), a content provider, a view system, a phone manager, a resource manager, a notification manager, and the like.

A window manager provides a window manager service for a window, so as to control and manage an interface displayed on a display.

The content provider is configured to store and obtain data, and enable the data to be accessed by an application program. The data may include a video, an image, audio, calls that are made and received, a browsing history and a bookmark, a phone book, and the like.

The view system includes visual controls such as a control for displaying a text and a control for displaying an image. The view system may be used to construct an interface of an application.

The phone manager is configured to provide a communication function for the electronic device, for example, management of a call status (including answering, declining, or the like).

The resource manager provides, for an application program, various resources such as a localized character string, an icon, a picture, a layout file, and a video file.

The Android runtime includes a kernel library and a virtual machine. The Android runtime is a runtime environment in the Android operating system and is responsible for scheduling and managing the Android operating system.

The kernel library includes two parts: One part is a performance function that needs to be invoked by Java language, and the other part is a kernel library of the Android operating system.

The application program layer and the application program framework layer run on the virtual machine. The virtual machine executes Java files at the application program layer and the application program framework layer as binary files. The virtual machine is configured to implement functions such as object lifecycle management, stack management, thread management, security and exception management, and garbage collection.

The system library may include a plurality of function modules, for example, a status detection module, a gesture recognition module, a screenshot service module, a media library, a surface manager, and a graphics processing library.

The status detection module is configured to recognize a physical form of a display of the electronic device. For example, the status detection module may be configured to determine the physical form of the display based on sensor data uploaded by various sensors at the hardware layer.

The gesture recognition module is configured to recognize a gesture operation of the user on the display of the electronic device. For example, the gesture operation includes a touch operation of the user on the display, for example, a slide operation, a tap operation, or a press operation.

The media library supports playback and recording of audios and videos in multiple formats, and opening of static images in multiple formats. The media library may support a plurality of audio and video coding formats, for example, MPEG4, H.264, MP3, AAC, AMR, JPG, and PNG.

The surface manager is configured to manage a display subsystem and provide fusion of 2D and 3D layers for a plurality of application programs.

The graphics processing library is configured to implement three-dimensional graphics drawing, image rendering, compositing, layer processing, and the like. A 2D graphics engine is a drawing engine for 2D drawing.

The kernel layer is a layer between hardware and software of the electronic device. The kernel layer includes at least a display driver, a sensor driver, a camera driver, an audio driver, and the like, and is configured to drive hardware at the hardware layer.

The hardware layer may include various sensors (for example, a touch sensor), a display, a camera, and the like.

Figure 3B:
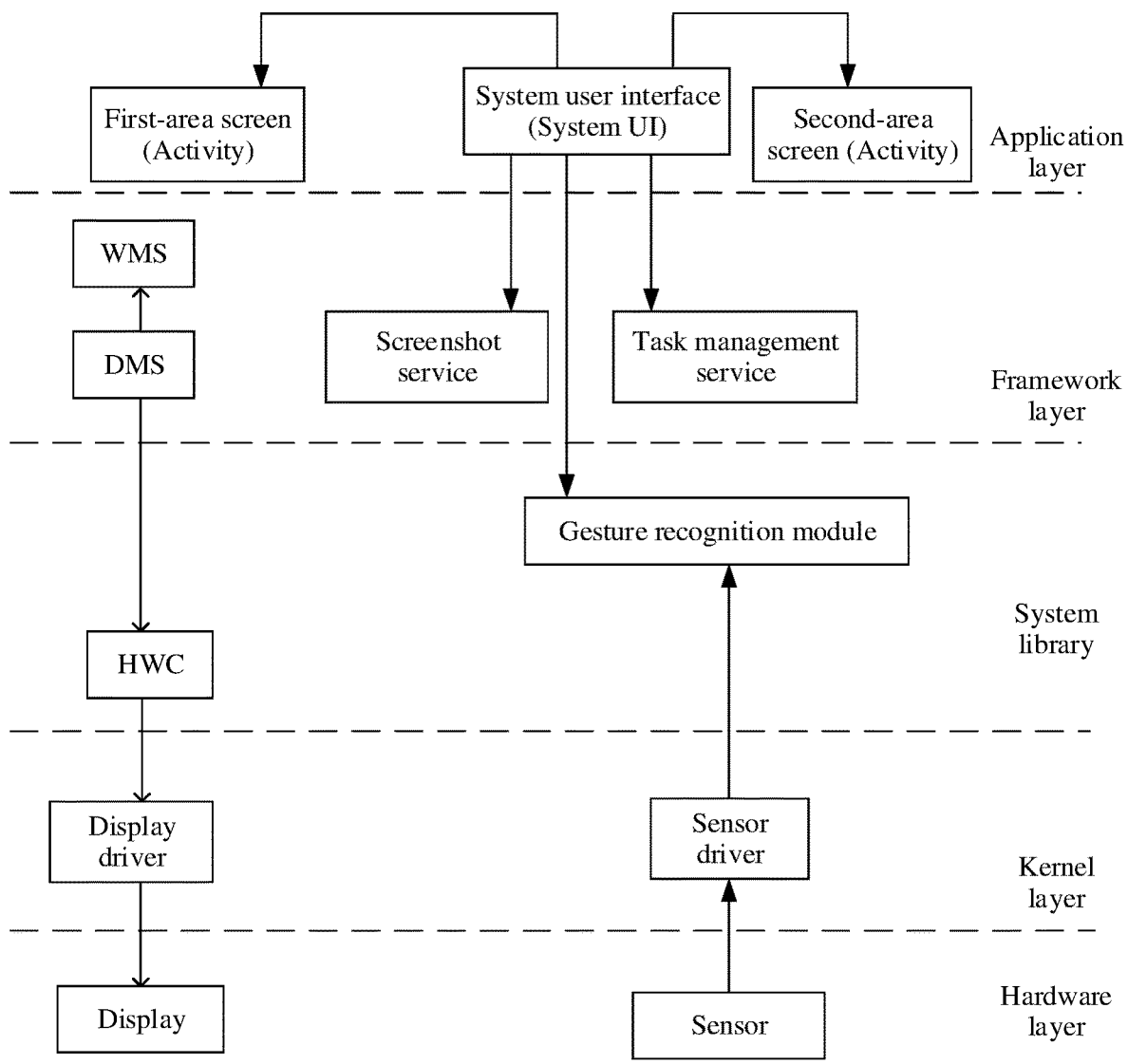
FIG. 3B is a schematic diagram of a data flow direction of an Android operating system according to an embodiment of this application.

FIG. 3B is a schematic diagram of a data flow direction of an Android operating system according to an embodiment of this application. For example, a system UI may monitor a gesture recognition module. After detecting data, a sensor may report the detected data to a sensor driver, and then the sensor driver reports the detected data to the gesture recognition module. After the gesture recognition module recognizes a gesture operation, the system UI may call a corresponding service based on a result recognized by the gesture recognition module. For example, when the gesture recognition module recognizes that the gesture operation is a screenshot operation for a second-area activity, the system UI may call a screenshot service to take a screenshot for the second-area activity, and then send a thumbnail obtained after the screenshot to a first-area activity.

It should be noted that, in this application, the first-area activity represents a display interface of the first area on the display 194. The second-area activity represents a display interface of the second area on the display 194. The system UI represents a system-level application, and functions of the system UI include status bar information display, a taskbar display panel, a notification panel, and the like.

The following embodiments are described by using an example in which the embodiments are applied to the architecture of the mobile phone 100 shown in FIG. 1.

In addition, in embodiments of this application, "at least one" means one or more, and "a plurality of" means two or more. In addition, it should be understood that in the description of this application, terms such as "first" and "second" are merely used for differentiation and description.

With reference to the accompanying drawings, the following describes in detail the display method provided in embodiments of this application.

Figure 4:
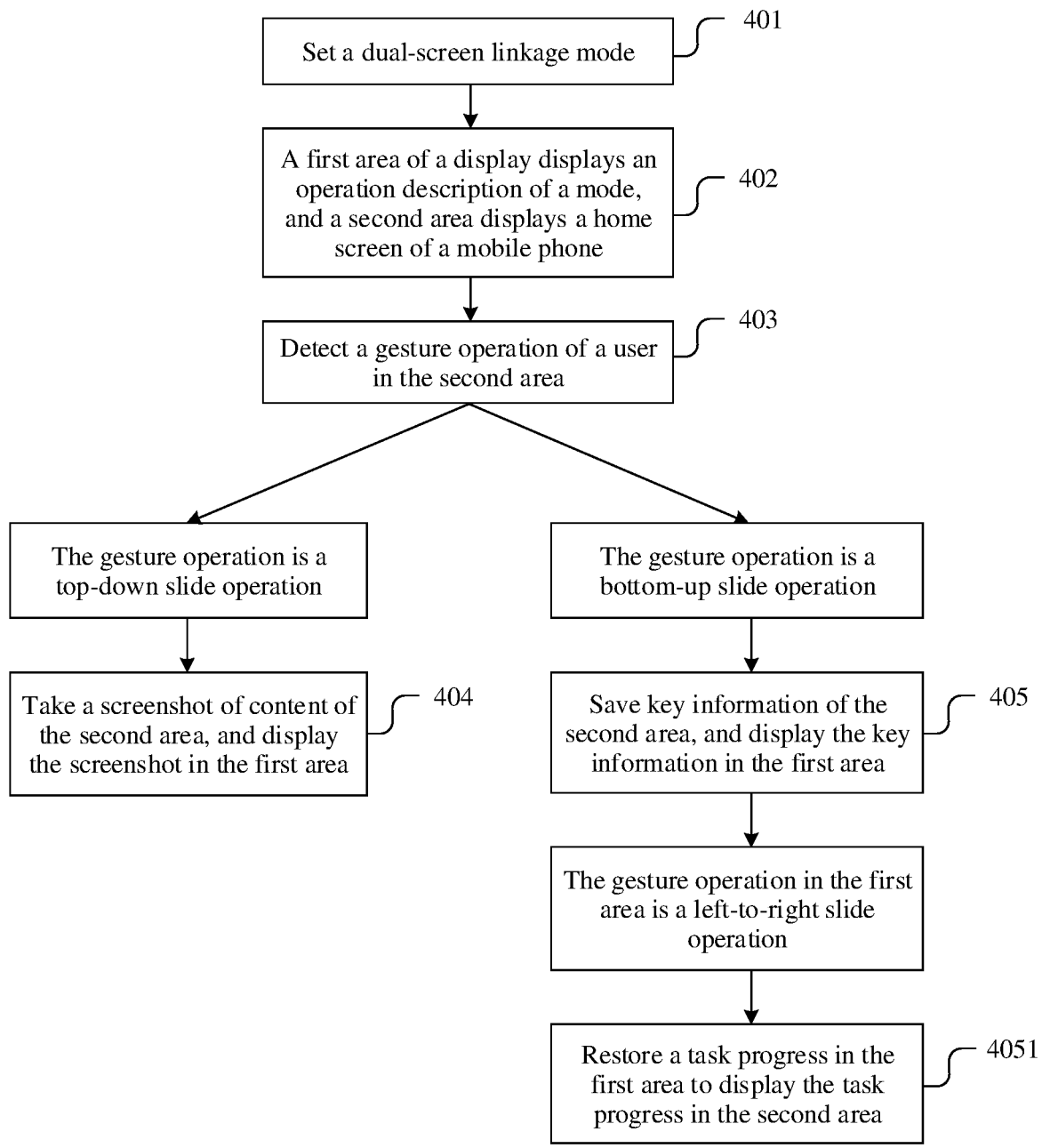
FIG. 4 is a schematic flowchart of a method according to an embodiment of this application.

FIG. 4 is a flowchart of a method according to an embodiment of this application. As shown in FIG. 4, the method may include the following steps.

Step 401: Set a dual-screen linkage mode.

In this embodiment of this application, a new working mode is set for the mobile phone 100. In the working mode, a display of the mobile phone 100 may be divided into two areas, that is, the display may simultaneously display two windows. For ease of description, the working mode is denoted as the "dual-screen linkage mode" below, and the working mode may have another name. This is not limited in this application.

It should be noted that, in the dual-screen linkage mode, the display of the mobile phone 100 is divided into two areas. In an initial state after the mode is enabled, one area displays an operation instruction of the dual-screen linkage mode, for example, is denoted as a first interface. The other area displays a second interface of the mobile phone 100, for example, may be an operation interface of an application program or a home screen of the mobile phone 100.

Figure 2:
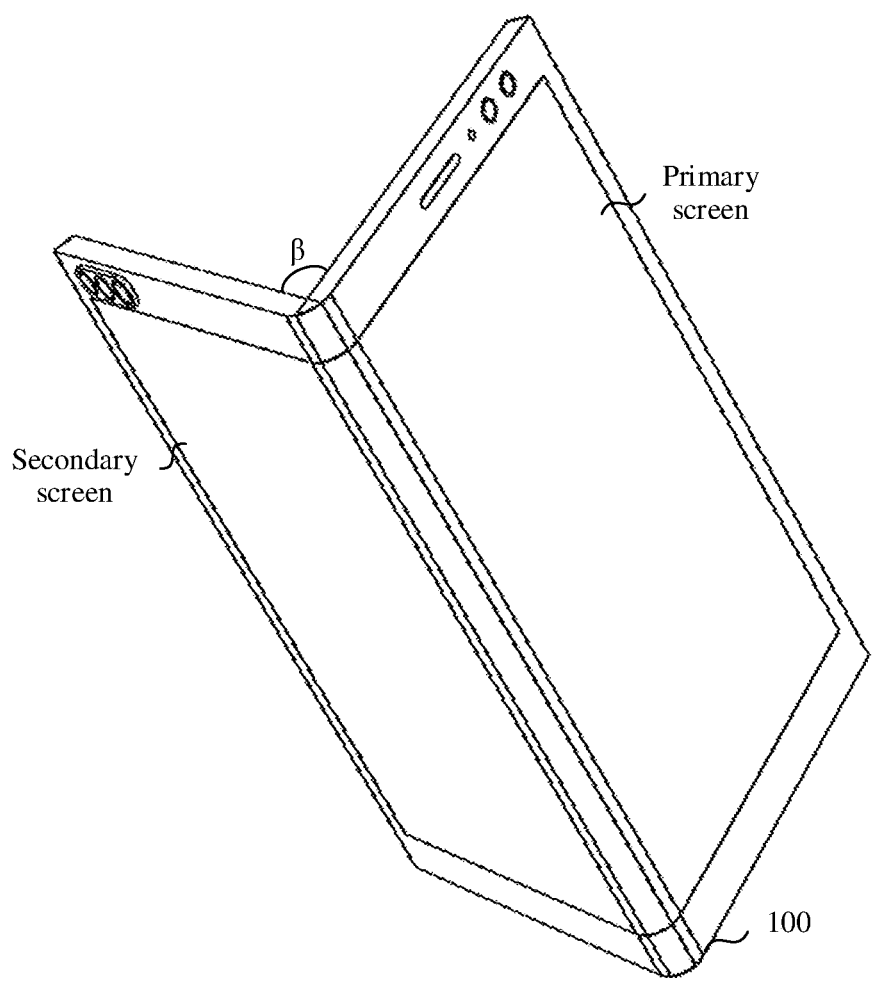
FIG. 2 is a schematic diagram of a foldable display according to an embodiment of this application.
Figures 1, 5A:
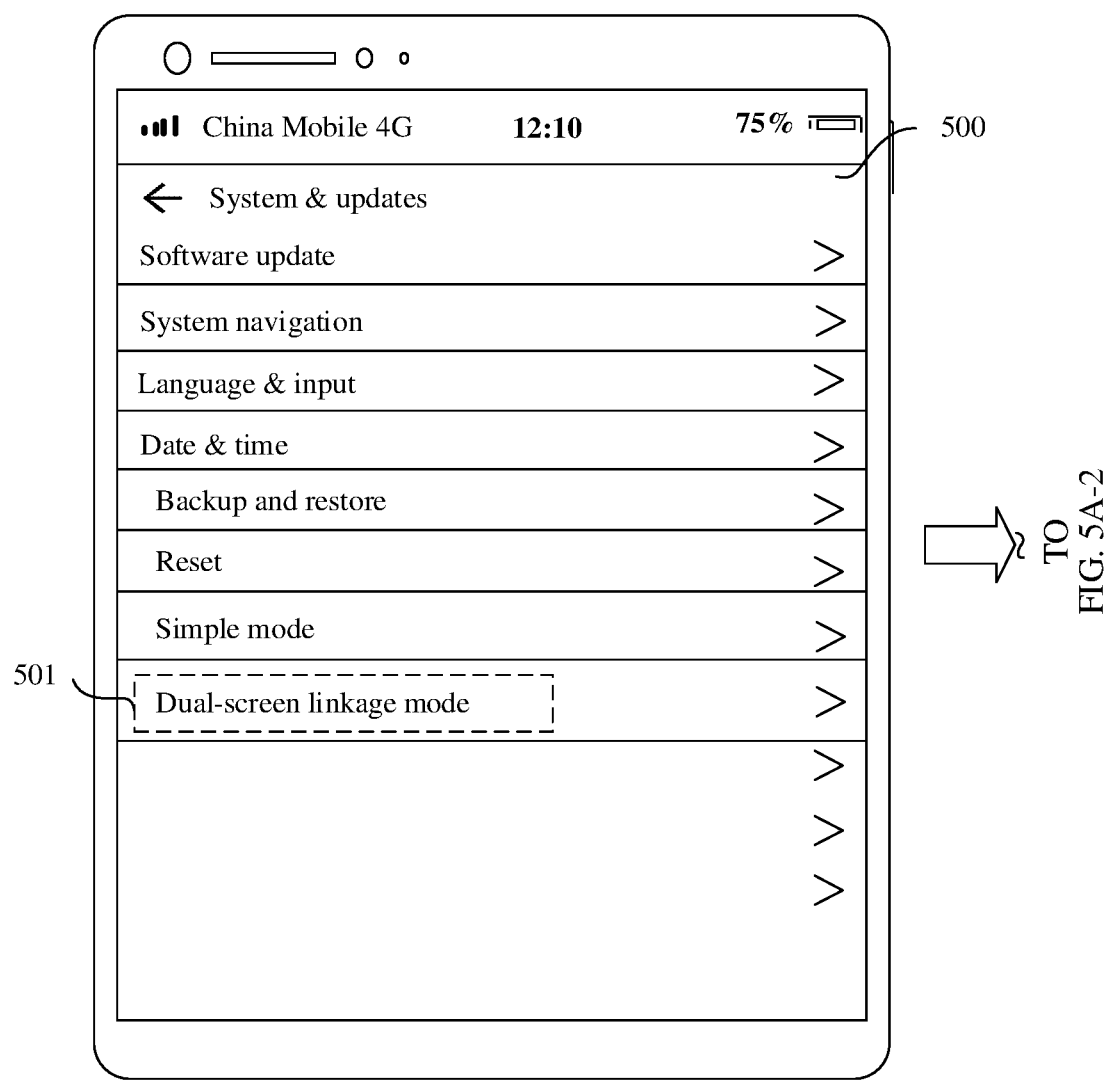
Figures 2, 5A:
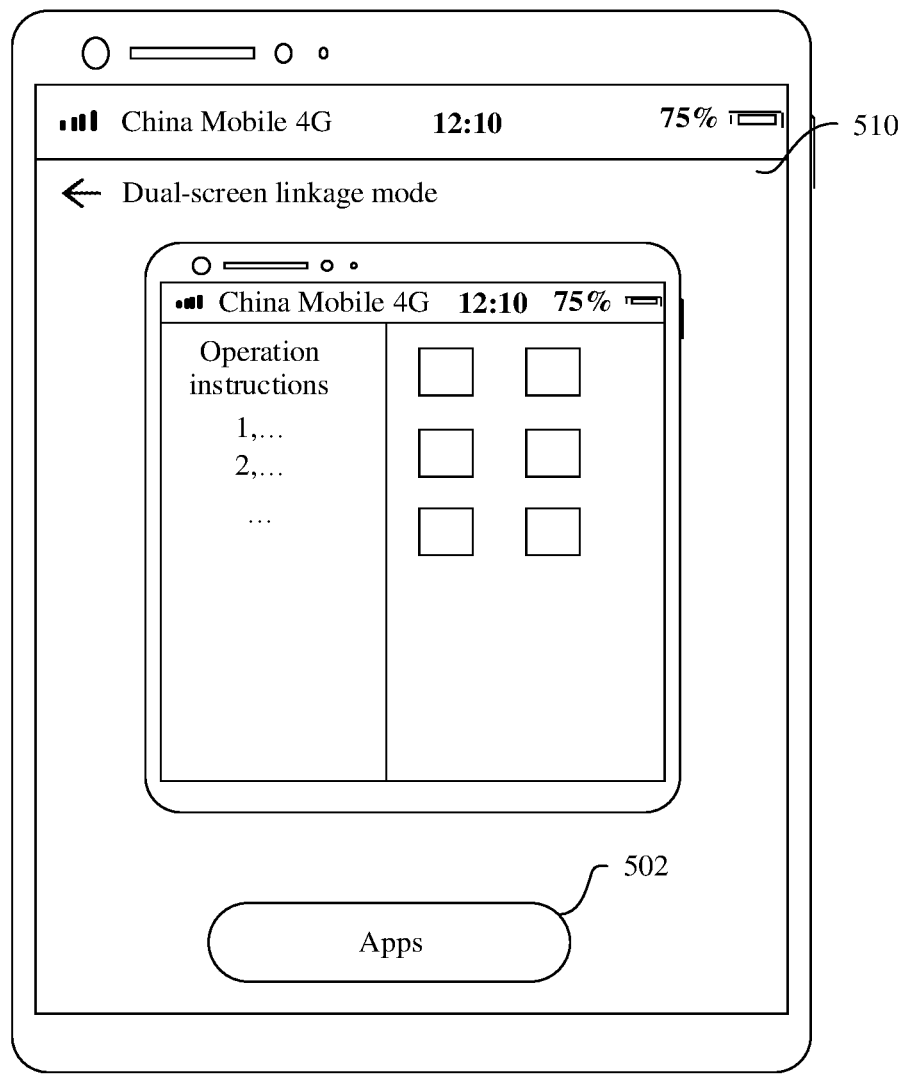

FIG. 5A-1 and FIG. 5A-2 are a schematic diagram of a settings interface of a dual-screen linkage mode according to an embodiment of this application. For example, a user may tap a "settings" application on a mobile phone, find a "system & update" interface 500 on the settings interface, and tap a "dual-screen linkage mode" 501 on the interface to enter a "dual-screen linkage mode" interface 510. A schematic diagram of an interface in the dual-screen linkage mode may be displayed on the interface. In this case, the mobile phone 100 may enter the dual-screen linkage mode by tapping an "applications" 502. It may be understood that the "applications" 502 is used to enable the dual-screen linkage mode.

It should be noted that, in this embodiment of this application, when the mobile phone 100 is in the dual-screen linkage mode, sizes of the two areas obtained by dividing the display may be the same or may be different. This is not limited in this application.

Certainly, it may be understood that a switch of the dual-screen linkage mode may also be disposed on a notification bar on the display. The user may open the notification bar through a gesture operation (for example, a slide down from the top of the screen), and then directly tap the switch of the notification bar to enable the dual-screen linkage mode. Alternatively, the user may enable the dual-screen linkage mode through a gesture operation. This is not limited in this application.

Step 402: A first area of the display displays the operation instruction of the mode, and a second area displays an interface of the mobile phone.

Figures 1, 5B:
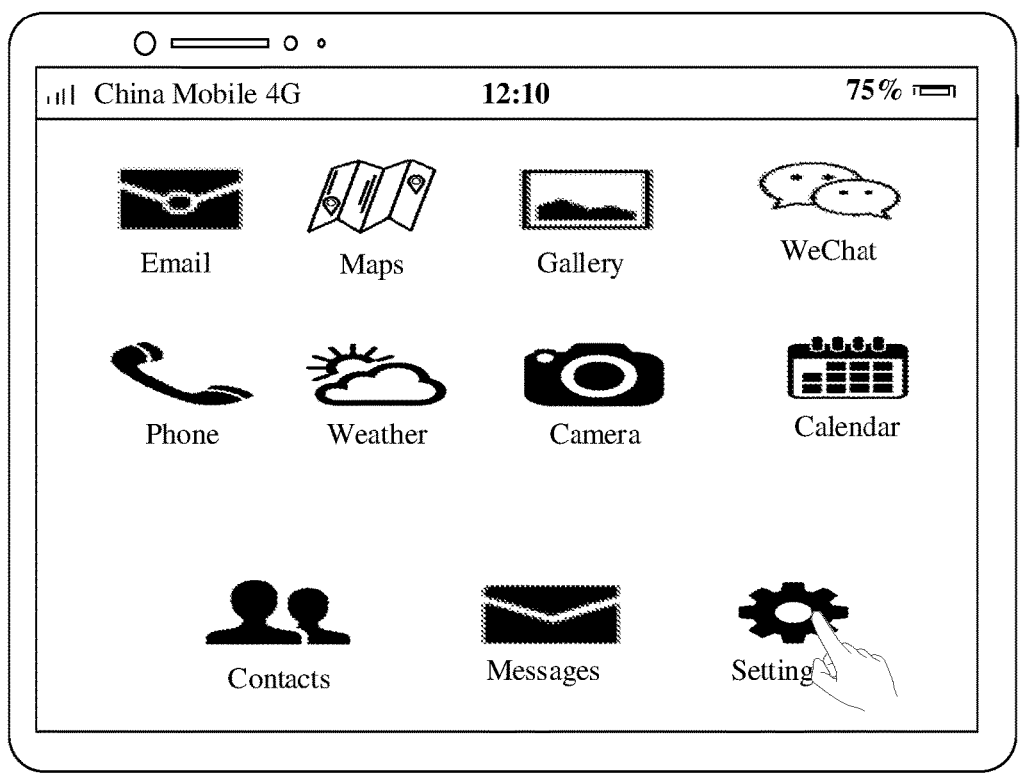
Figures 2, 5B:
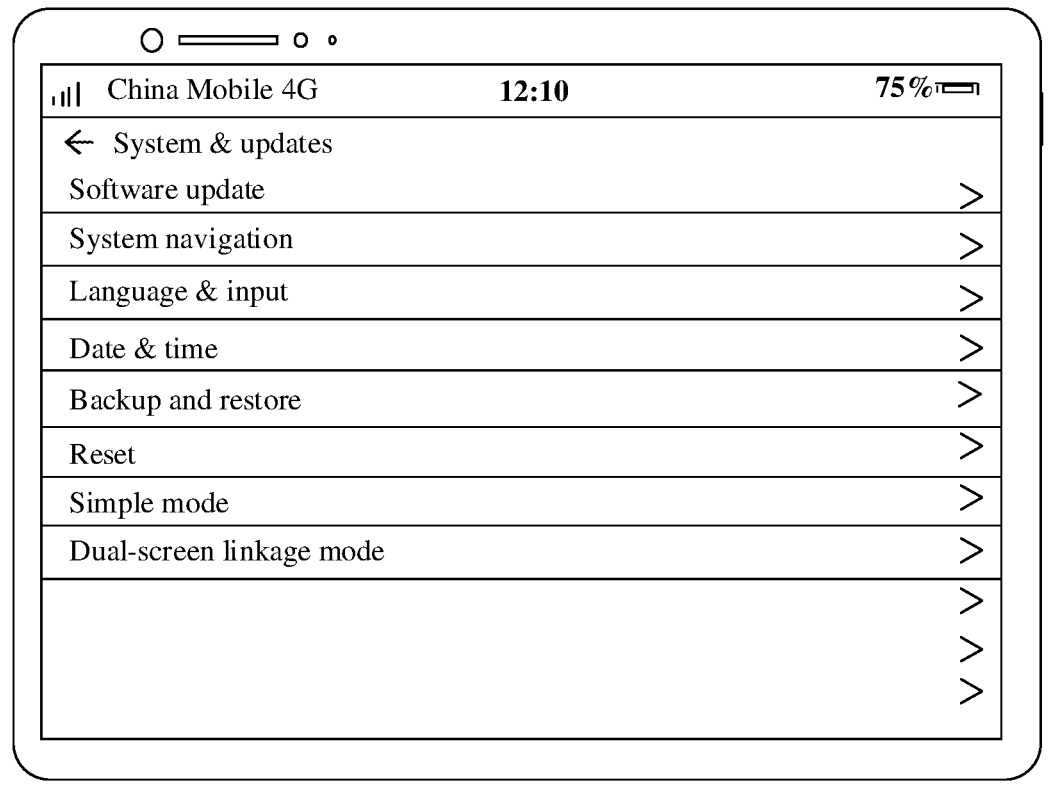

For ease of description below, the two areas obtained by dividing the display in the dual-screen linkage mode may be denoted as the "first area" and the "second area". It may be understood that the first area and the second area are merely intended to distinguish between the two areas on the display. A location relationship between the first area and the second area is not limited in this application. The first area and the second area may be disposed side by side (as shown in a lower-left figure in FIG. 5B-1 to FIG. 5B-4), or may be disposed up and down (in other words, one of the first area and the second area is located above the other). This is not limited in this application.

In some embodiments, after the mobile phone 100 is set to the dual-screen linkage mode, the display may be divided into the first area and the second area. The first area may display the operation instruction of the mode, to be specific, the first area is denoted as a first interface. The second area may display a second interface of the mobile phone 100. It should be noted that the operation instruction of the dual-screen linkage mode includes but is not limited to the following content: how to take a screenshot in the mode, how to delete a screenshot, how to save a task progress, how to exit the mode, or the like. For example, as shown in the lower-left figure in FIG. 5B-1 to FIG. 5B-4: 1. Slide down to take a screenshot. 2. Tap x to exit full screen. 3. Tap x to delete a thumbnail. 4. Slide up to save a task progress.

In some other embodiments, the first area may alternatively display a thumbnail, and content of the thumbnail is a screenshot of the second interface or key information in the second interface. It may be understood that the key information in the second interface may be operation step information of the user in the second interface, for example, a pattern formed by each operation performed by the user during drawing.

It should be noted that, when the first area displays the screenshot of the second interface, the screenshot may include information in the status bar of the mobile phone 100, for example, time information and battery level information. When the first area displays the key information in the second interface, the thumbnail may not display the information in the status bar of the mobile phone 100.

In a possible implementation, after the dual-screen linkage mode is enabled, the second interface may display the home screen of the mobile phone 100 by default. For example, refer to FIG. 5B-1 to FIG. 5B-4. That is, regardless of whether the interface of the mobile phone 100 displays the home screen, an interface of an application program, or the like before the mode is enabled, after the mode is enabled, the second area may directly display the home screen of the mobile phone 100.

Figures 3, 5B:
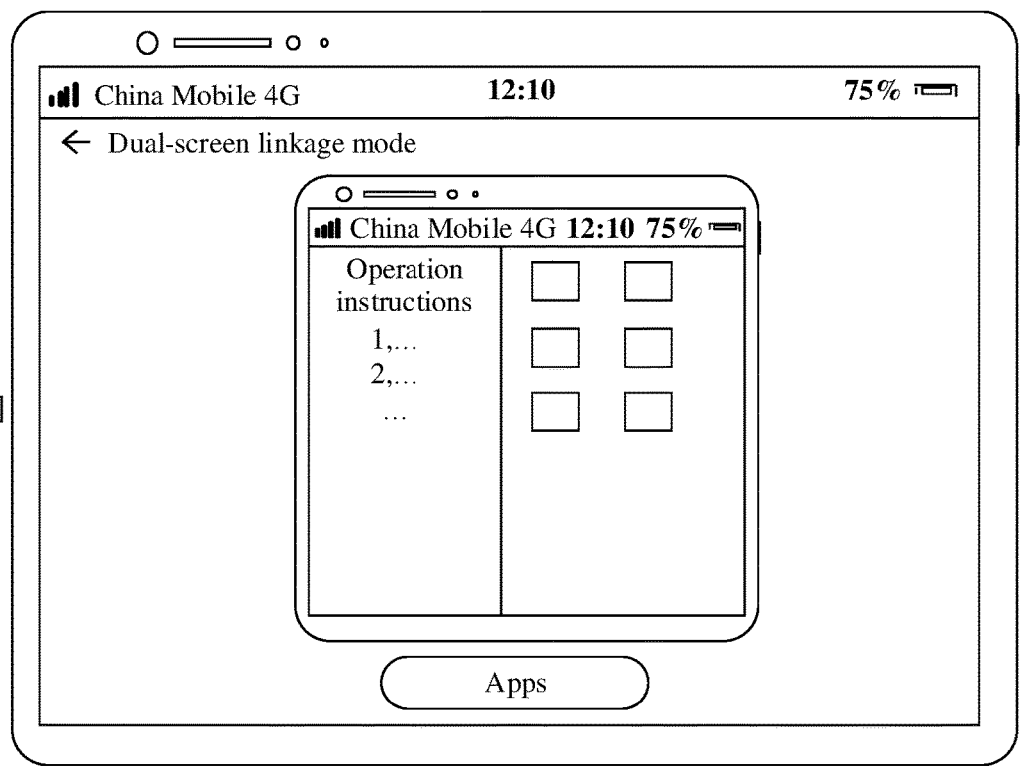
Figures 4, 5B:
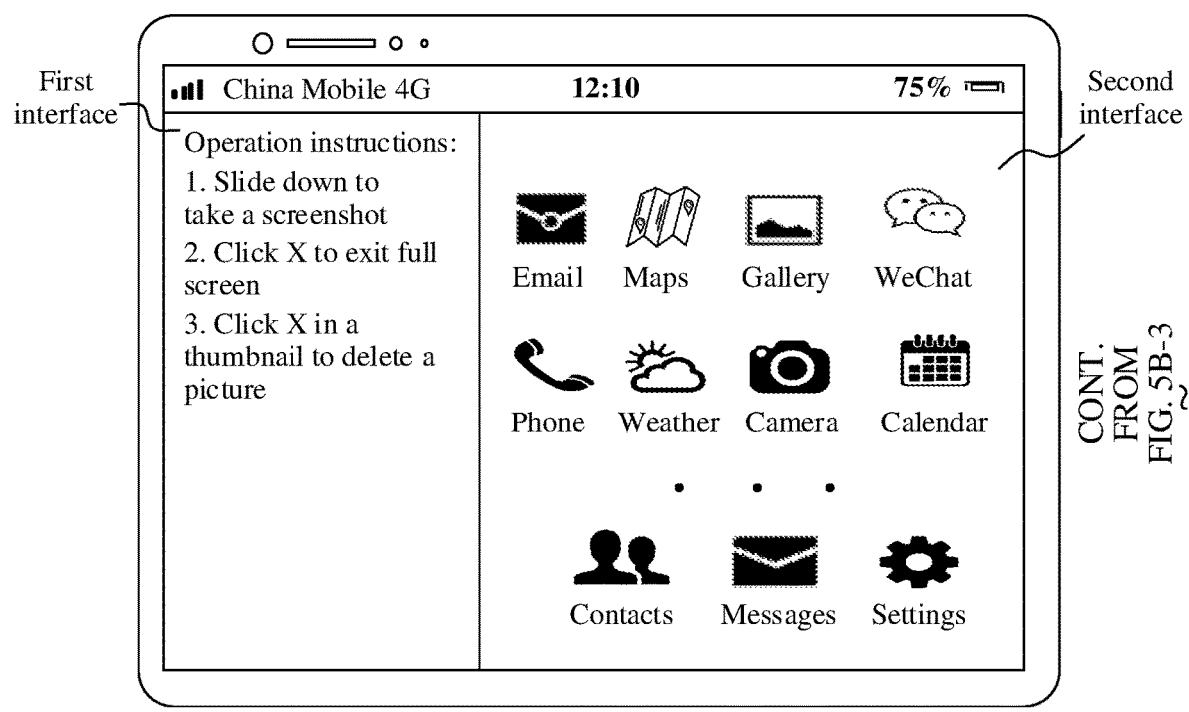
Figures 1, 5C:
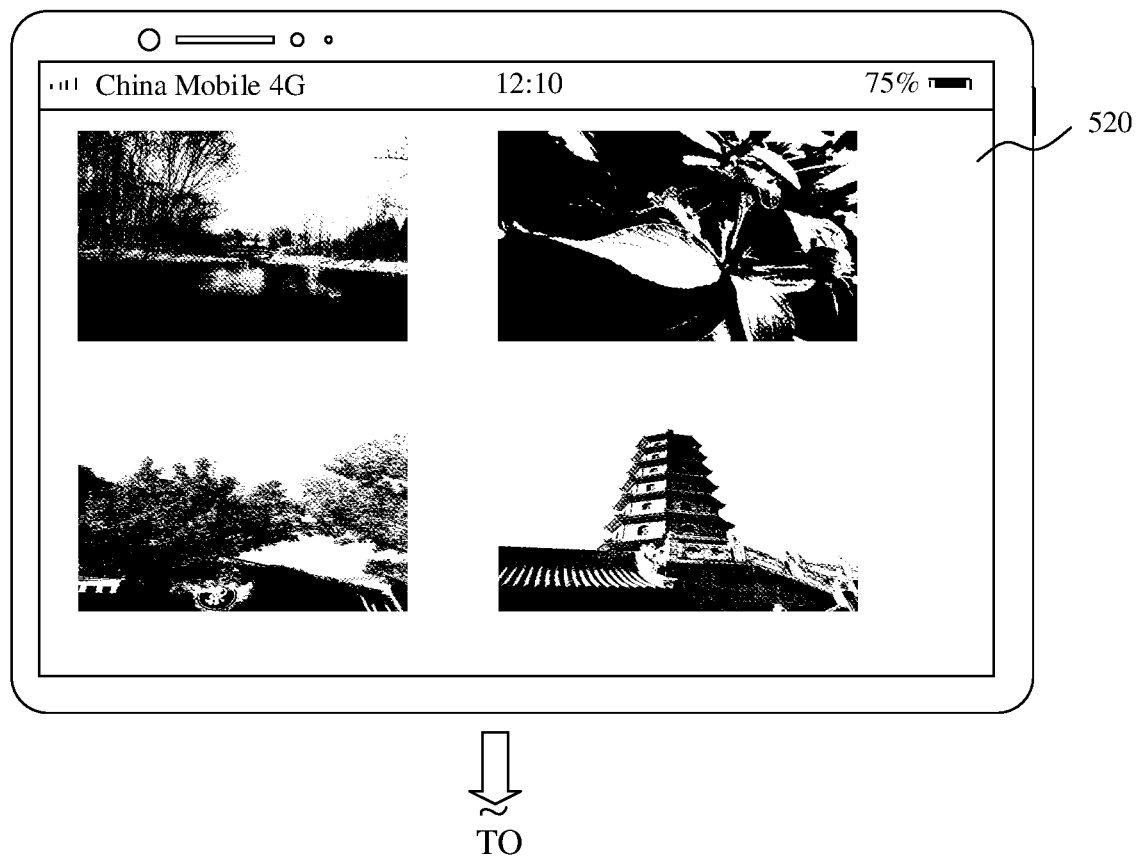
Figures 2, 5C:
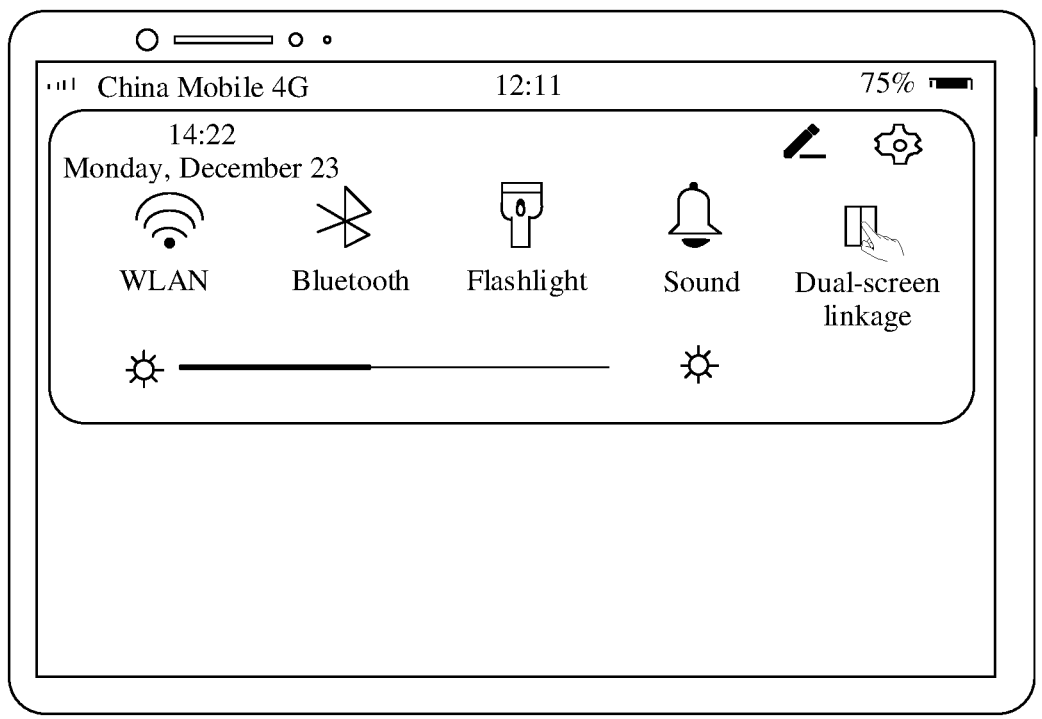
Figures 3, 5C:
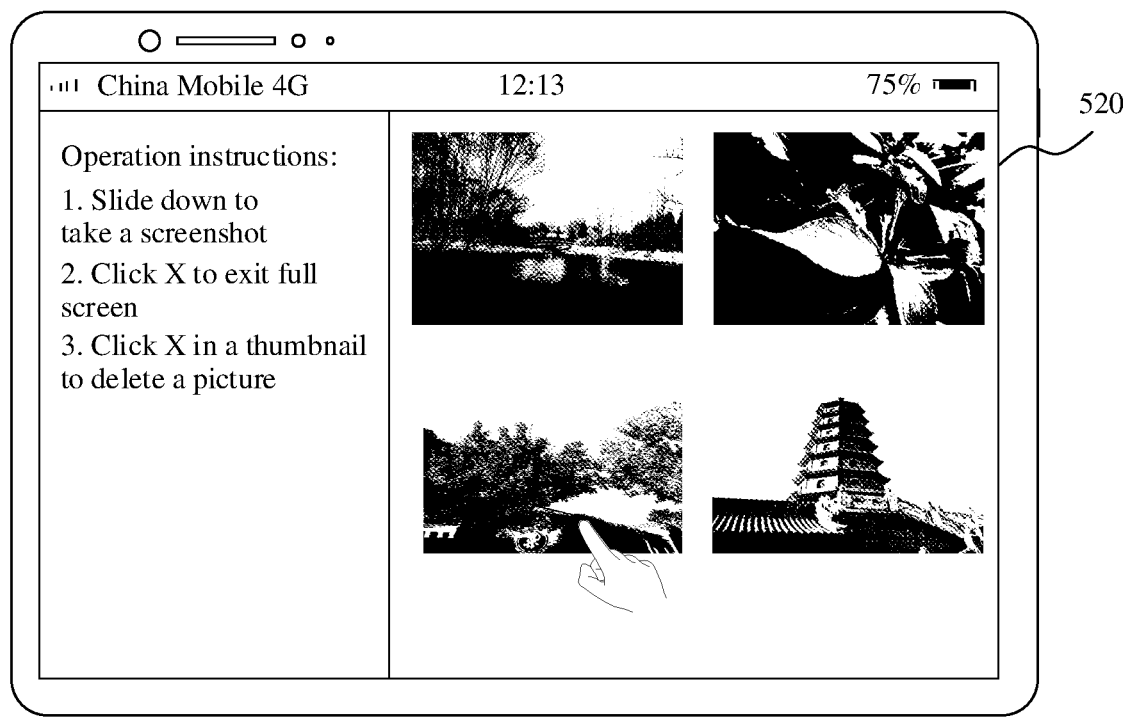

In another possible implementation, after the dual-screen linkage mode is enabled, the second interface may be an interface that is being displayed before the user enables the mode. For example, before the mode is enabled, the interface of the mobile phone 100 is an interface 520 of a gallery application shown in FIG. 5C-1 to FIG. 5C-3. After the mode is enabled, content displayed in the second area is the interface 520.

It should be noted that, in this application, when the user slides down from the top of the screen to open the notification bar, and then directly taps the switch on the notification bar to enable the dual-screen linkage mode, an initial interface (an interface before the switch is turned on) displayed by the mobile phone 100 may be displayed at a lower layer of the notification bar. It may be understood that the accompanying drawings of this application are merely examples. The user may alternatively open the notification bar in a voice control manner, or may open the notification bar by performing a mid-air operation (for example, performing a gesture operation on the top of the screen), or may enable the dual-screen linkage mode in a voice control manner, or enable the dual-screen linkage mode by performing a mid-air operation. This is not limited in this application.

Figures 1, 2, 5D:
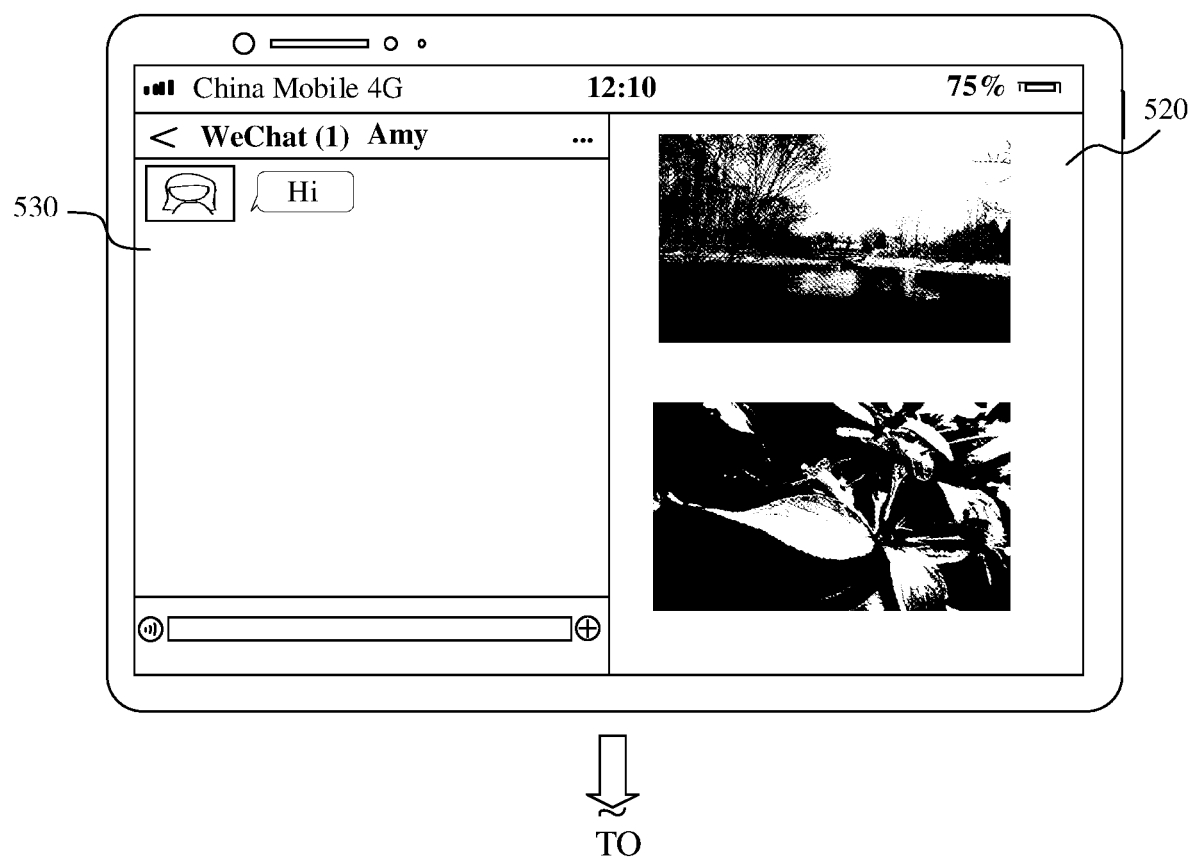
Figures 2, 5D:
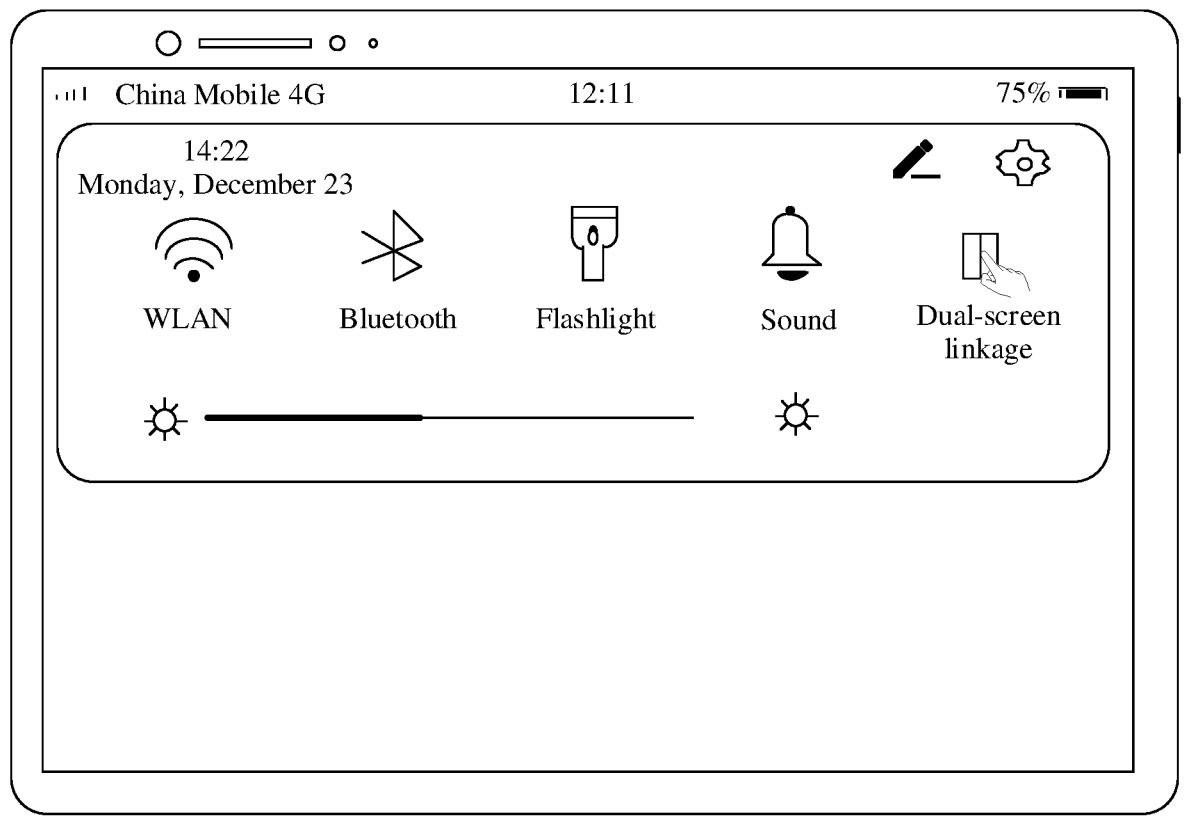
Figures 3, 5D:
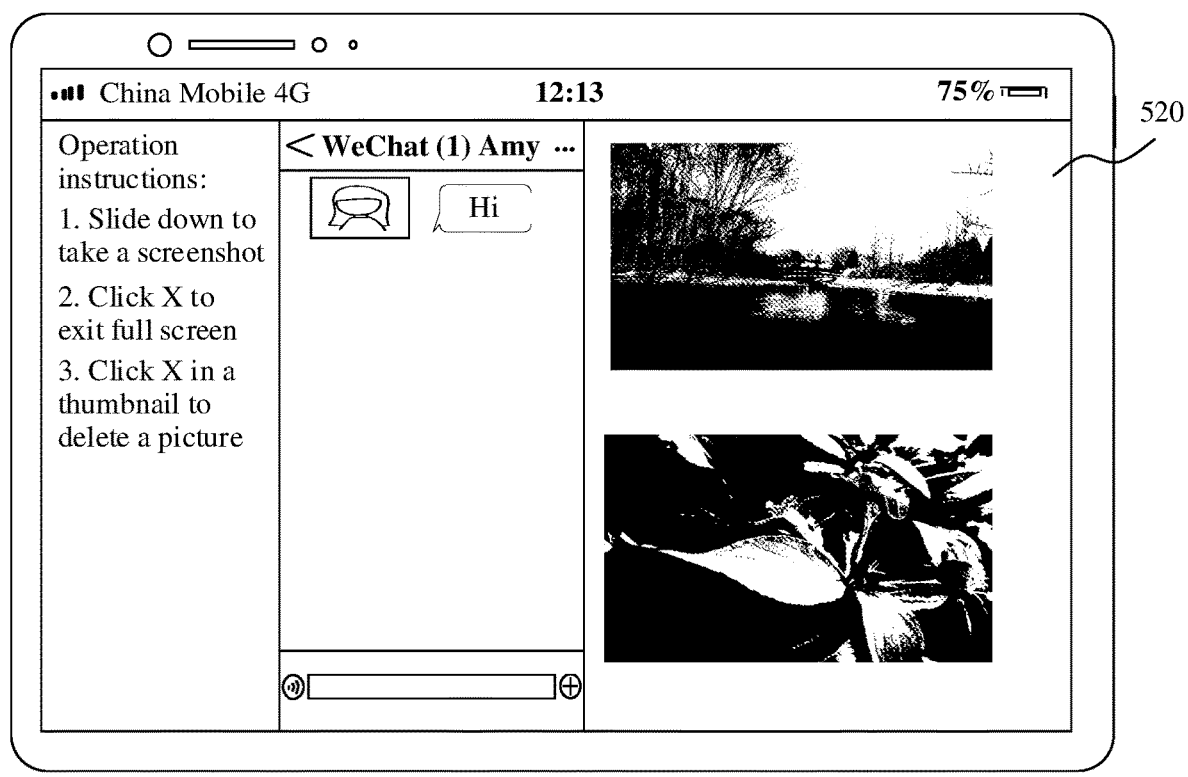

In still another possible implementation, when the mobile phone 100 is a foldable-screen mobile phone, for example, a display of the foldable-screen mobile phone includes a primary screen and a secondary screen (the primary screen is located on the right of the secondary screen), the following several cases may be included:

A first case: After the dual-screen linkage mode is enabled, the mode may be applied to the secondary screen by default, and the primary screen continues to display the original interface (that is, an interface that is being displayed on the primary screen before the dual-screen linkage mode is enabled). That is, after the dual-screen linkage mode is enabled, the secondary screen may be divided into a first area and a second area, that is, the second area may be displayed on the secondary screen. For example, refer to FIG. 5D-1 to FIG. 5D-3.

Figures 1, 5E:
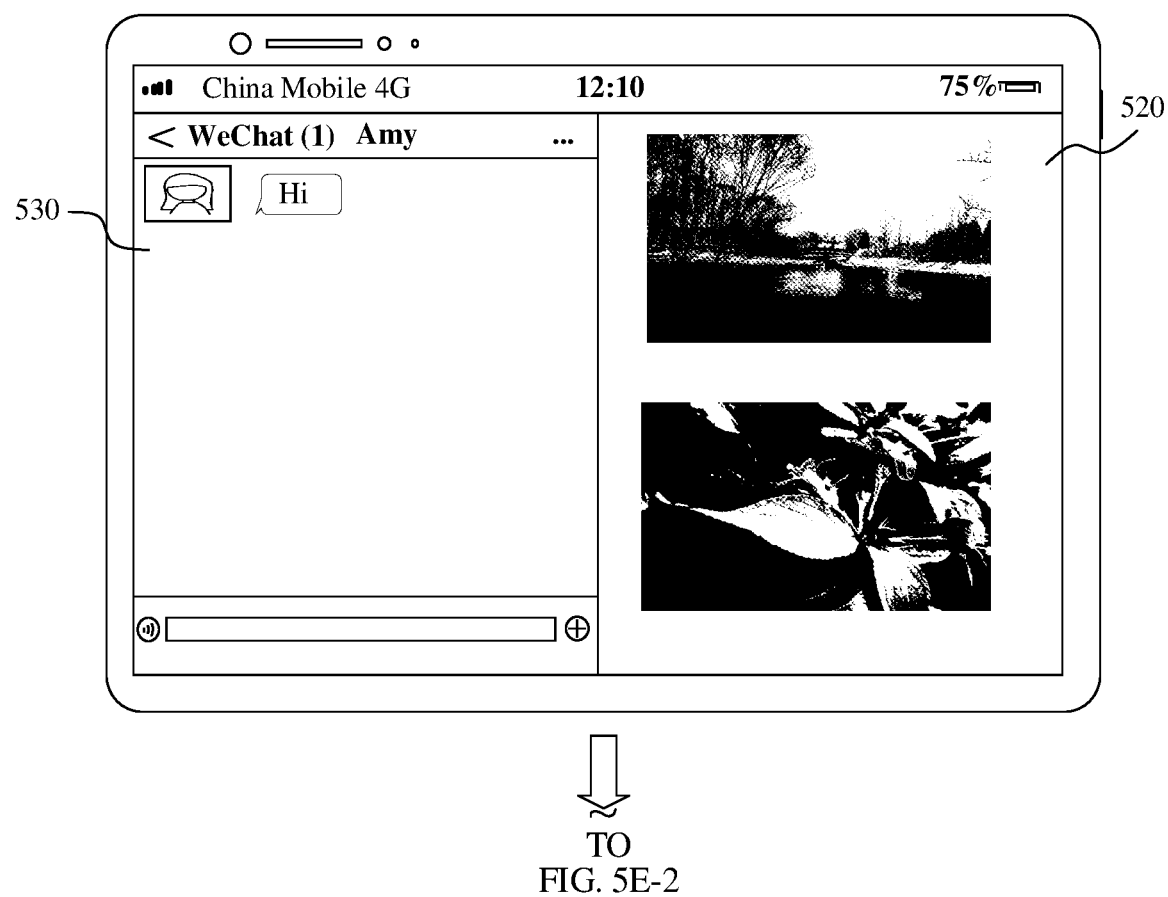
Figures 2, 5E:
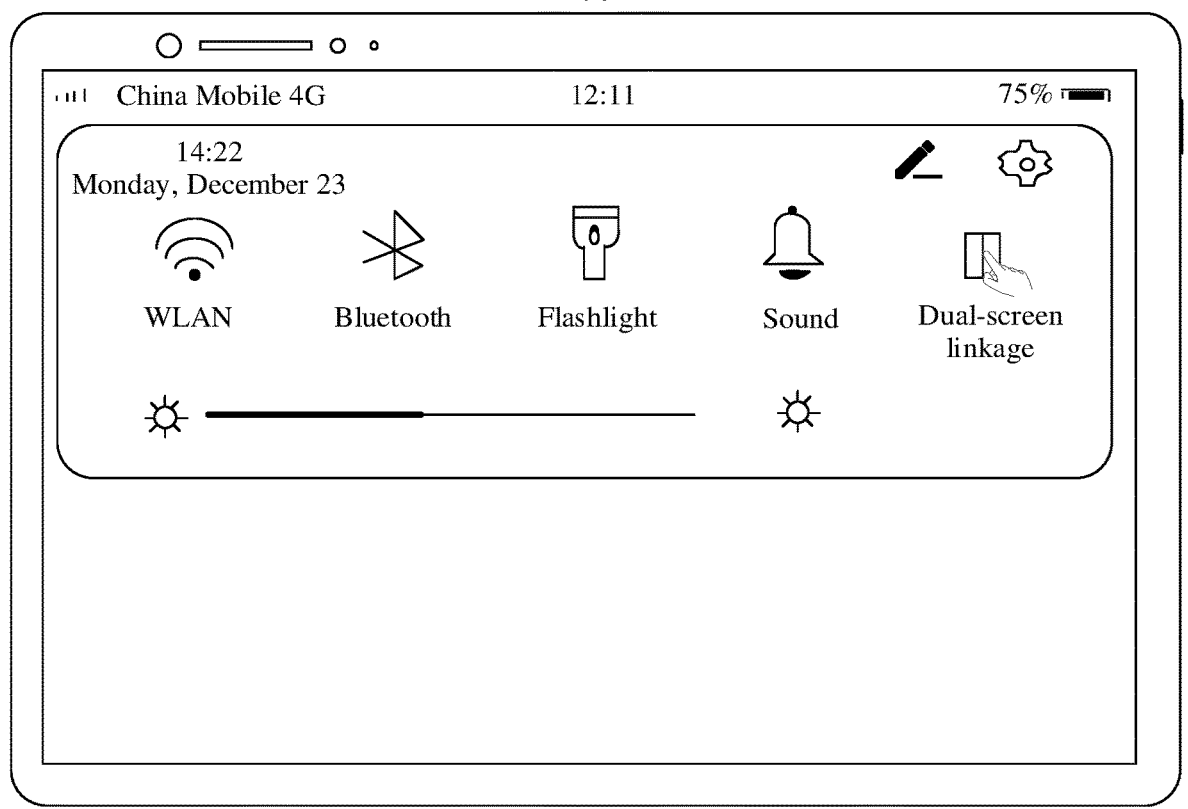
Figures 3, 5E:
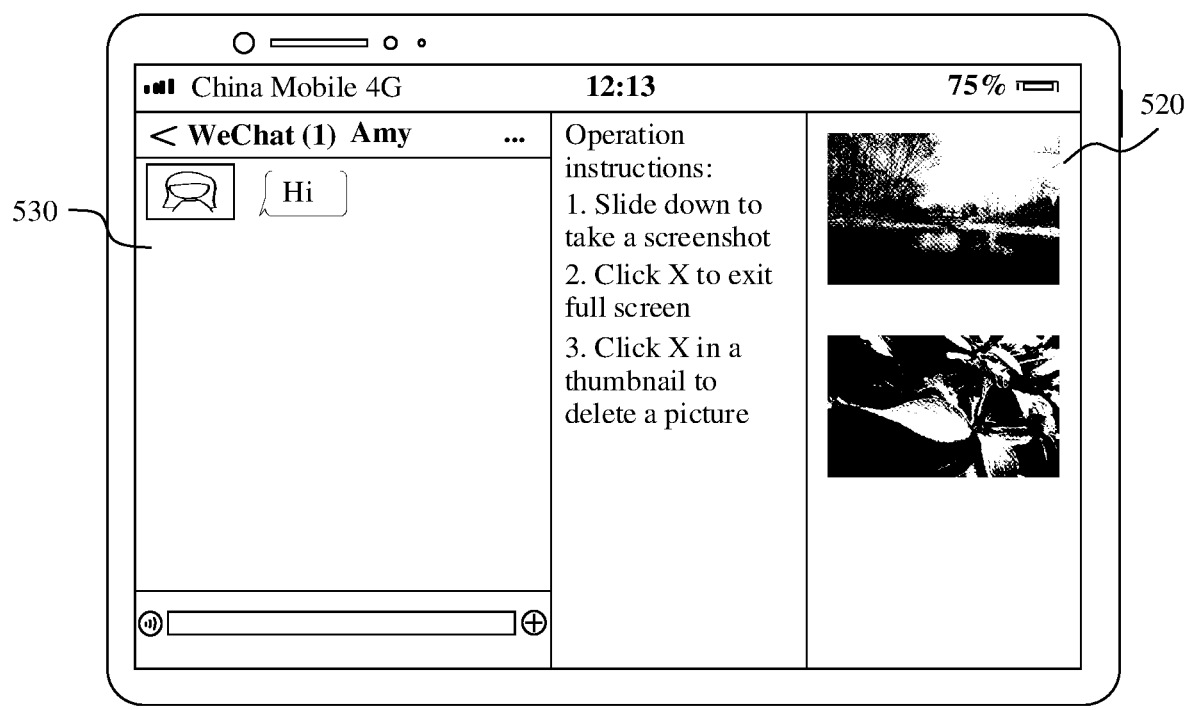

A second case: After the dual-screen linkage mode is enabled, the mode may be applied to the primary screen by default, and the secondary screen continues to display the original interface (that is, an interface that is being displayed on the primary screen before the dual-screen linkage mode is enabled). That is, after the dual-screen linkage mode is enabled, the primary screen may be divided into a first area and a second area, that is, the second area may be displayed on the primary screen. For example, refer to FIG. 5E-1 to FIG. 5E-3.

Figures 1, 2, 5F:
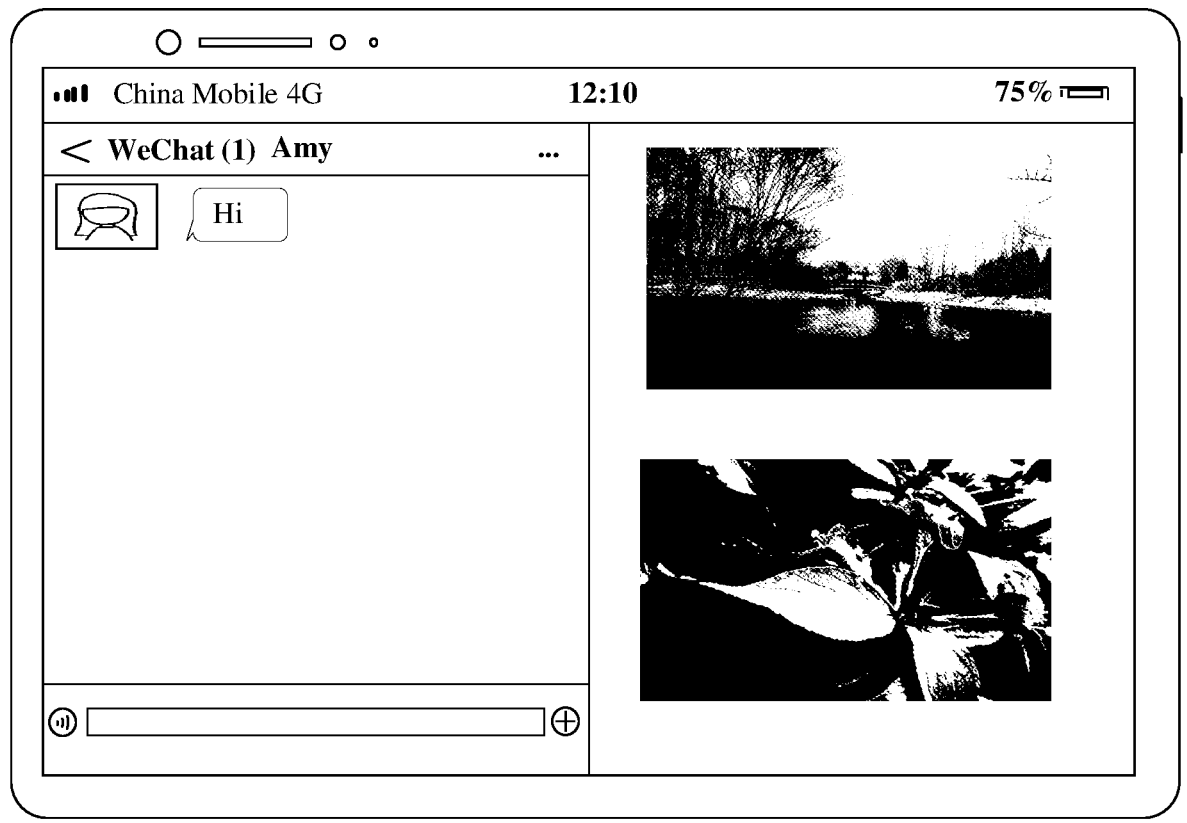
Figures 1, 2, 3, 5F:
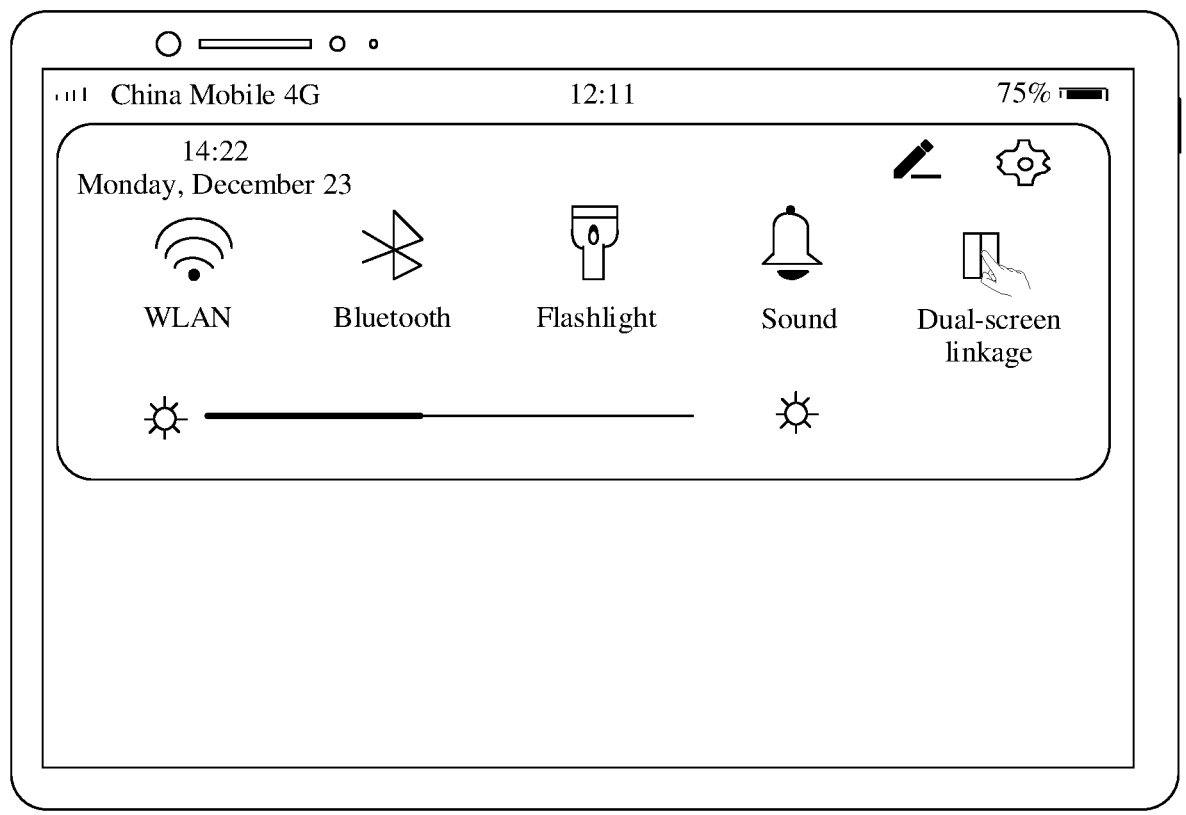
Figures 3, 5F:
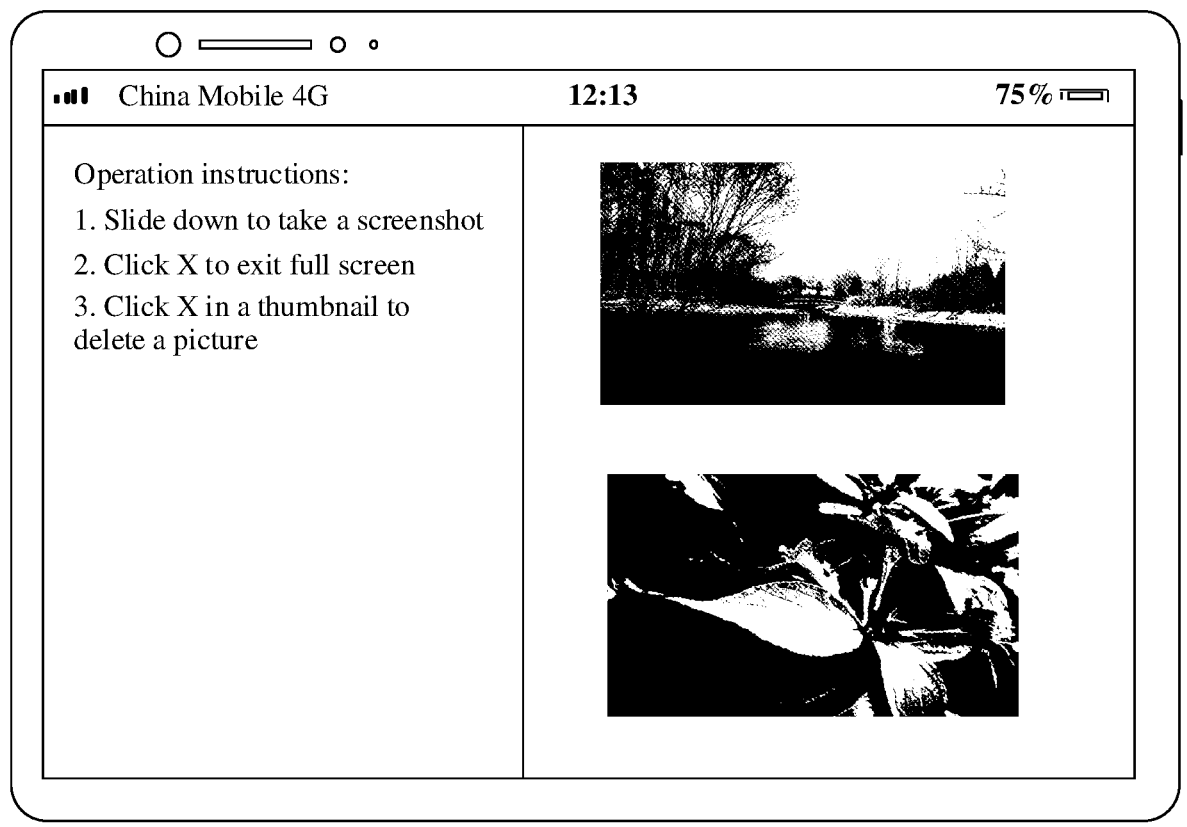

A third case: After the dual-screen linkage mode is enabled, the secondary screen may replace the operation instruction of the mode, and the primary screen continues to display the original interface (that is, an interface that is being displayed on the primary screen before the dual-screen linkage mode is enabled). For example, refer to FIG. 5F-1 to FIG. 5F-3.

Figures 1, 2, 5G:
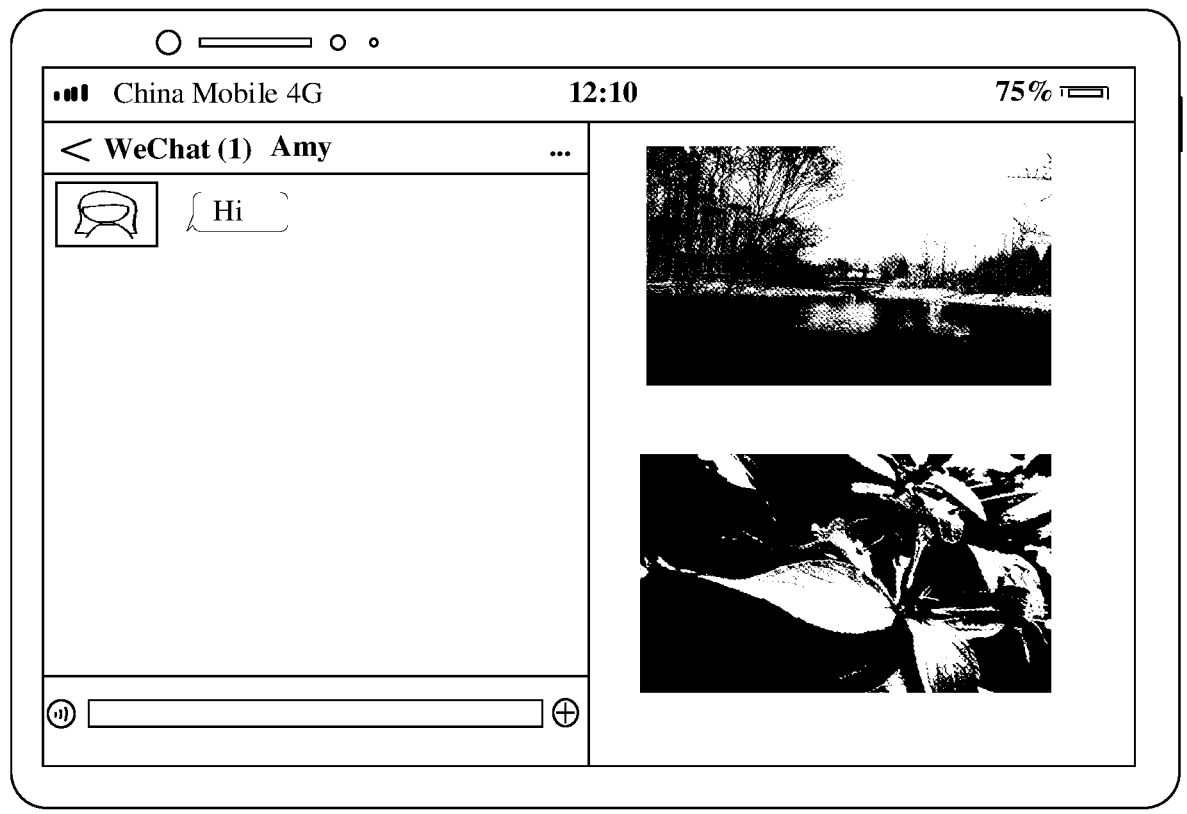
Figures 2, 5G:
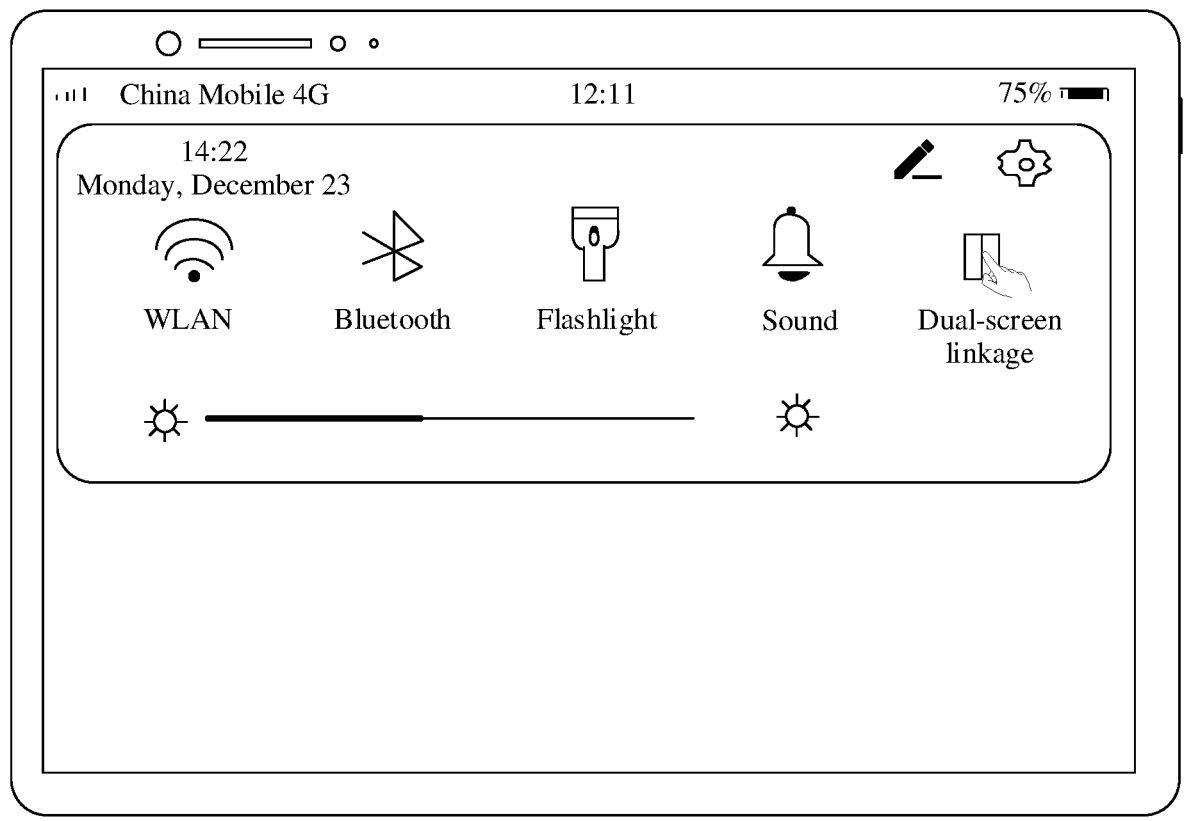
Figures 3, 5G:
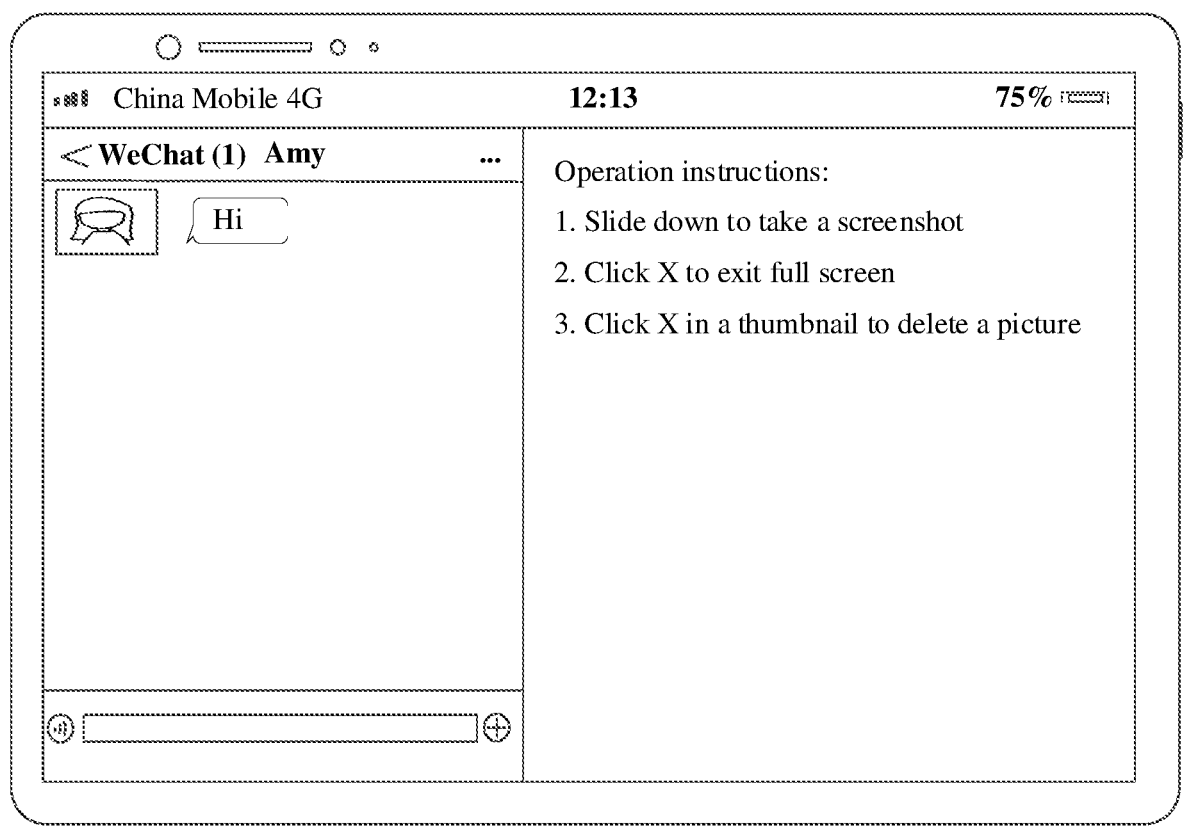

A fourth case: After the dual-screen linkage mode is enabled, the primary screen may replace the operation instruction of the mode, and the secondary screen continues to display the original interface (that is, an interface that is being displayed on the secondary screen before the dual-screen linkage mode is enabled). For example, refer to FIG. 5G-1 to FIG. 5G-3.

Certainly, it may be understood that, when the mobile phone is the foldable-screen mobile phone, after the dual-screen linkage mode is enabled, the mode may alternatively be applied to both the primary screen and the secondary screen by default, that is, both the primary screen and the secondary screen are divided into two areas respectively. This is not limited in this application.

It should be noted that, in this application, if the dual-screen linkage mode needs to be exited, the mode may be disabled through the switch on the notification bar, or the mode may be disabled by entering a settings interface. This is not limited in this application.

Step 403: Detect a gesture operation of the user in the second area.

In some embodiments of this application, a sensor at a hardware layer of the mobile phone 100 may report detected data to a hardware driver at a driver layer, and then the hardware driver at the driver layer reports the data detected by the sensor to a gesture recognition module. For example, when detecting an event corresponding to a slide operation of the user in the second area, a touch sensor may report the event corresponding to the slide operation to a sensor driver at the driver layer, and the sensor driver reports the slide operation detected by the touch sensor to the gesture recognition module.

Step 404: If the gesture operation of the user in the second area is a top-down slide operation, take a screenshot of content in the second area, and display the screenshot in the first area.

Figure 6A:
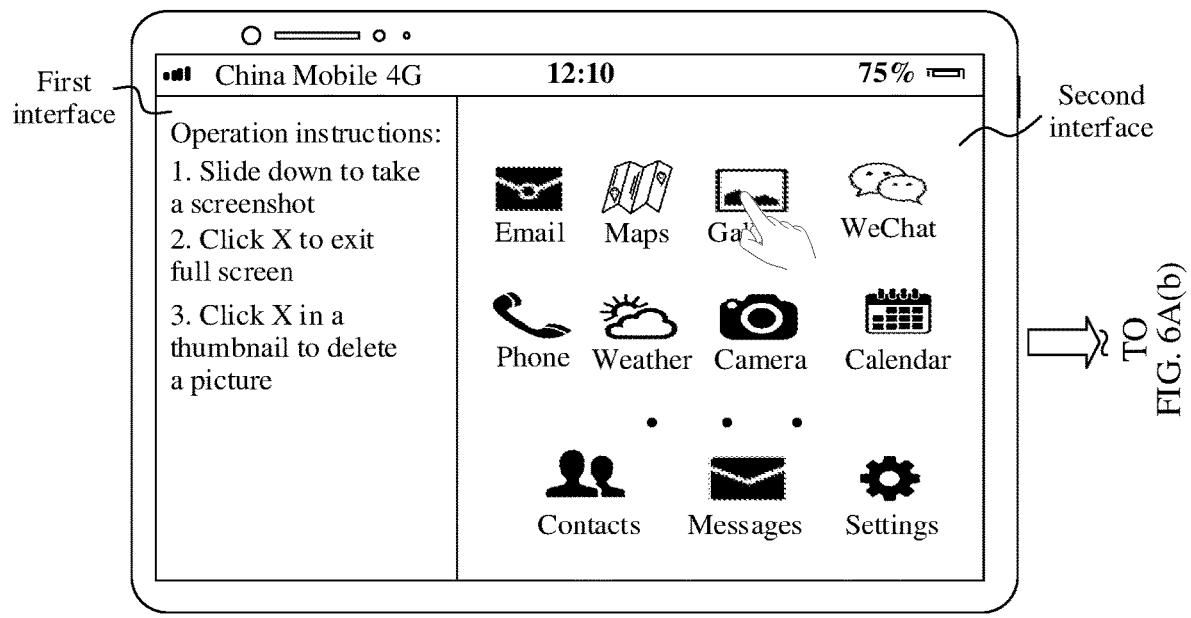
FIG. 6A(a) to FIG. 6A(d) and FIG. 6B(e) to FIG. 6B(h) each are a schematic diagram of an interface of a mobile phone 100 according to an embodiment of this application.
Figure 6A:
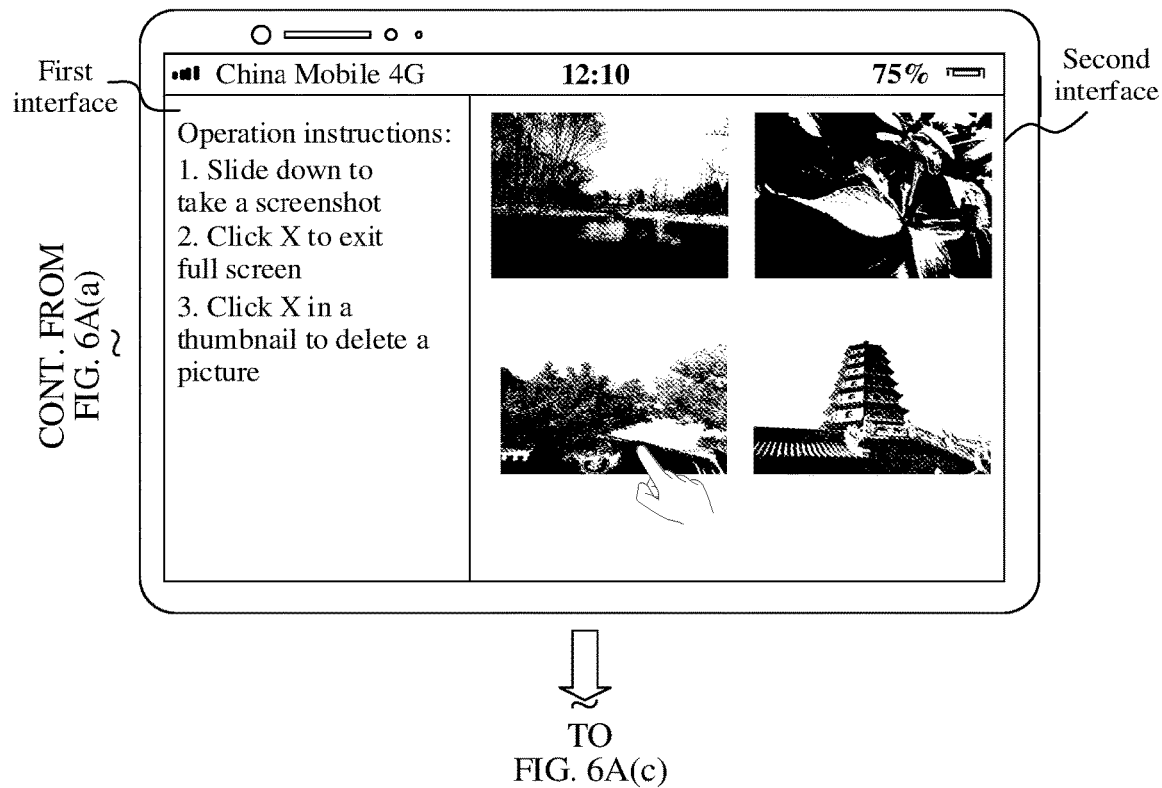
Figure 6A:
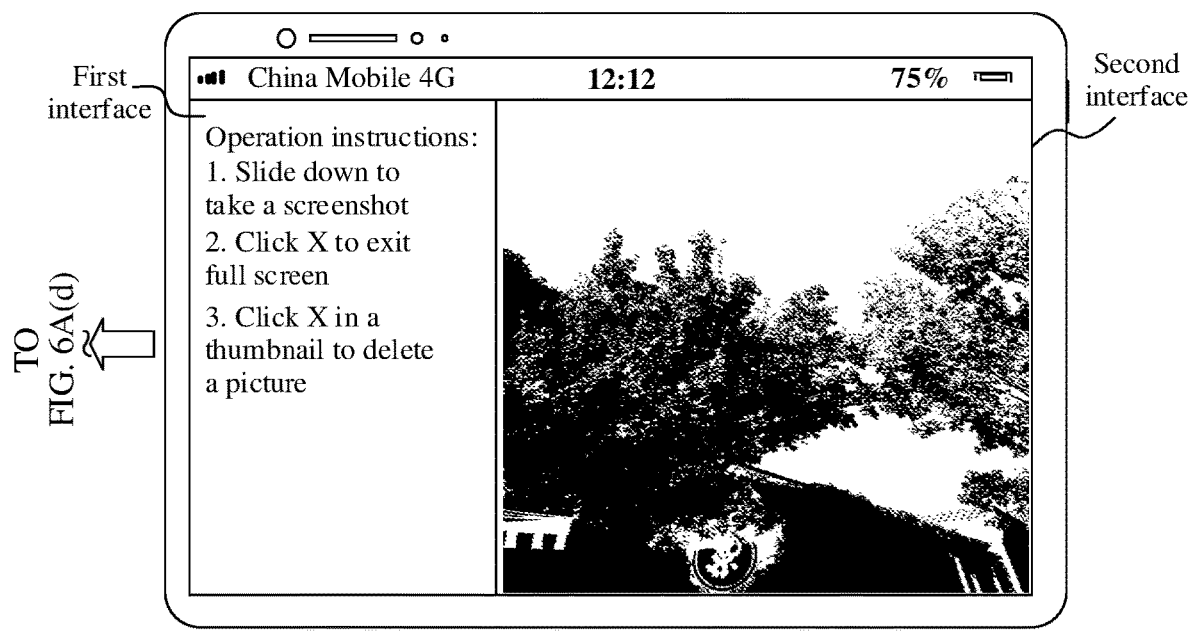
Figure 6A:
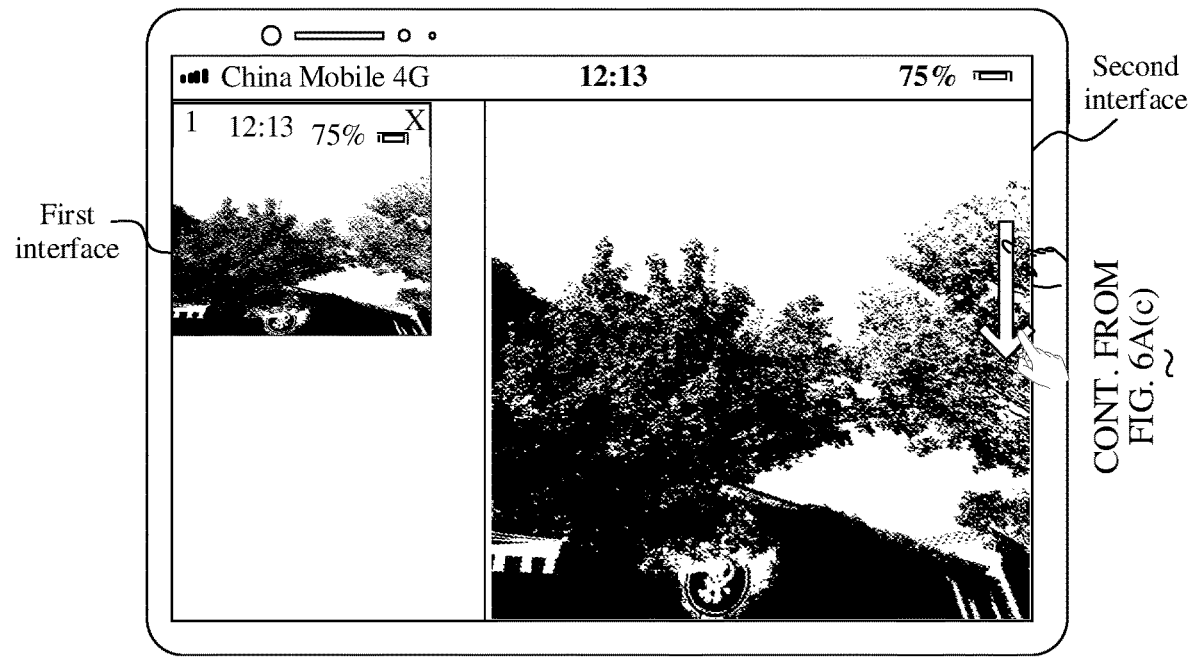

For example, the second area displays the home screen of the mobile phone 100. FIG. 6A(a) to FIG. 6A(d) are a schematic diagram of a group of interfaces according to an embodiment of this application. After the mobile phone 100 enters the dual-screen linkage mode, the display of the mobile phone 100 may display a first interface and a second interface, for example, as shown in FIG. 6A(a). The first interface displays the operation instruction in the dual-screen linkage mode, and the second interface displays the home screen of the mobile phone 100. It should be noted that the operation instruction of the dual-screen linkage mode shown in FIG. 6A(a) to FIG. 6A(d) is not limited to instructions listed in the foregoing schematic diagram. This is not limited in this application.

It is assumed that the user taps an application gallery on the second interface, a photo in the gallery may be displayed on the second interface, for example, as shown in FIG. 6A(b). After the user taps one photo (referred to as a "photo 1" below), the photo 1 may be displayed in full screen on the second interface, for example, as shown in FIG. 6A(c). If the user slides from top to bottom on a right edge of the second interface, for example, as shown in FIG. 6A(d), when the touch sensor of the mobile phone 100 detects the gesture operation from top to bottom along a right edge of the display, the gesture recognition module recognizes that the gesture operation is a slide operation on the second interface, and the slide operation is a screenshot operation. In this application, when a system UI detects that the gesture operation recognized by the gesture recognition module is the screenshot operation on the second interface, the system UI may obtain an interface currently displayed in the second area, and invoke a screenshot service of an application program framework layer to take a screenshot of the obtained interface currently displayed in the second area (that is, the second interface), to obtain a thumbnail 1 (referred to as a "screenshot 1" below) of the second interface. Then, the system UI may send the screenshot 1 to a first-area activity, for example, refer to the first interface in FIG. 6A(d).

It should be noted that the user may take a screenshot of a desired screen according to an actual requirement of the user, and the mobile phone displays these screenshots on the first interface sequentially, that is, at least one screenshot may be displayed on the first interface.

Figure 6B:
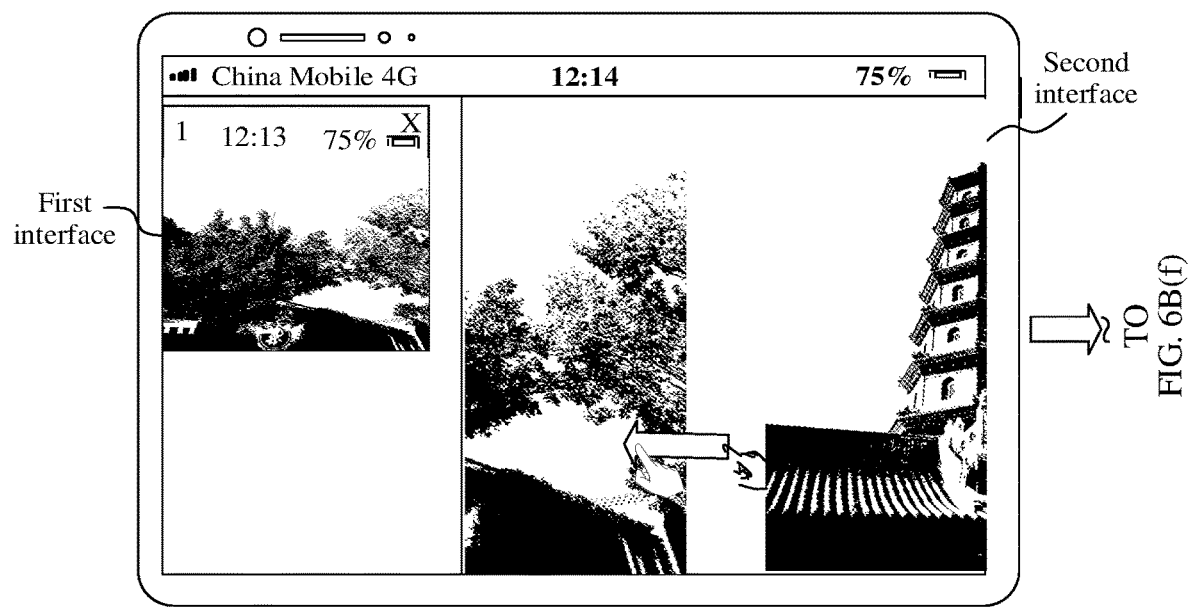
Figure 6B:
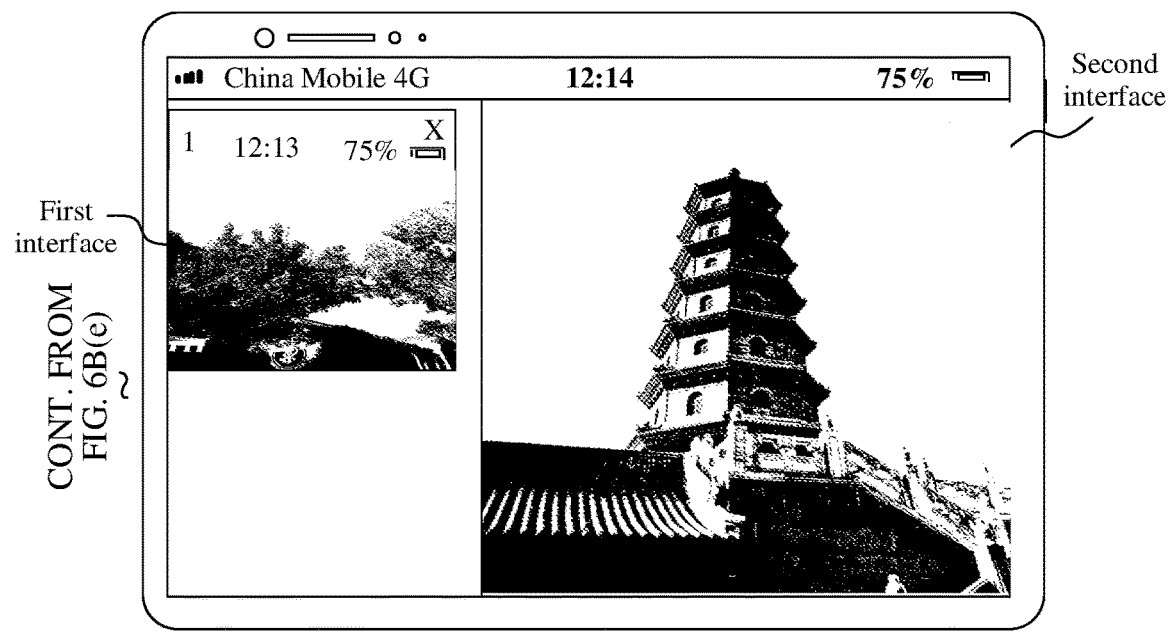
Figure 6B:
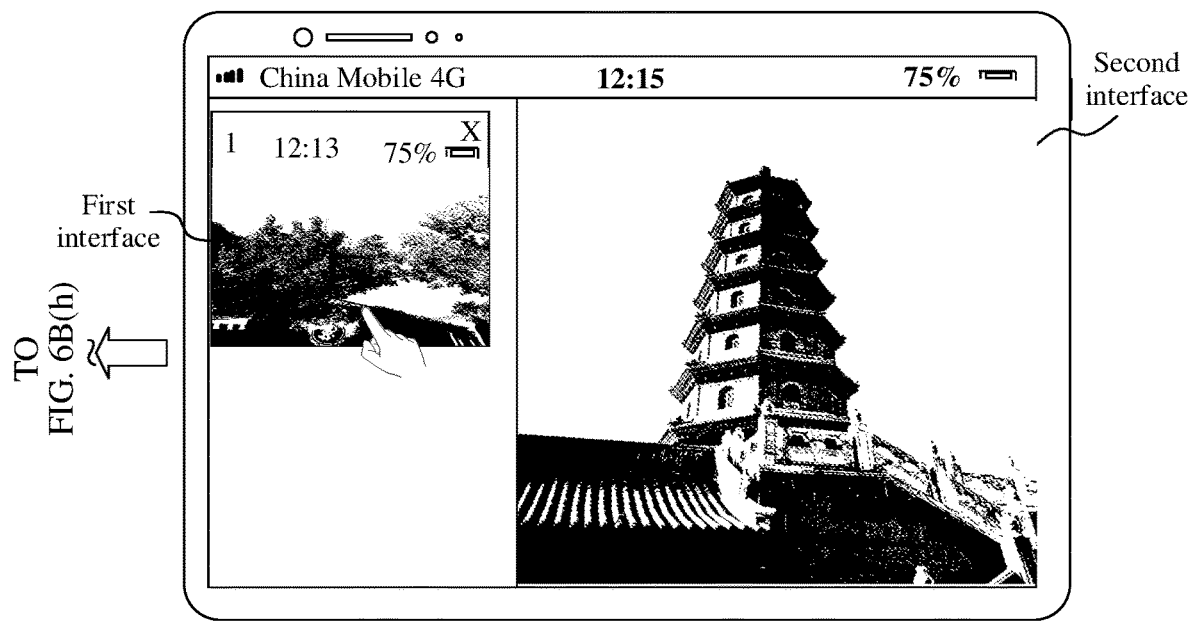
Figure 6B:
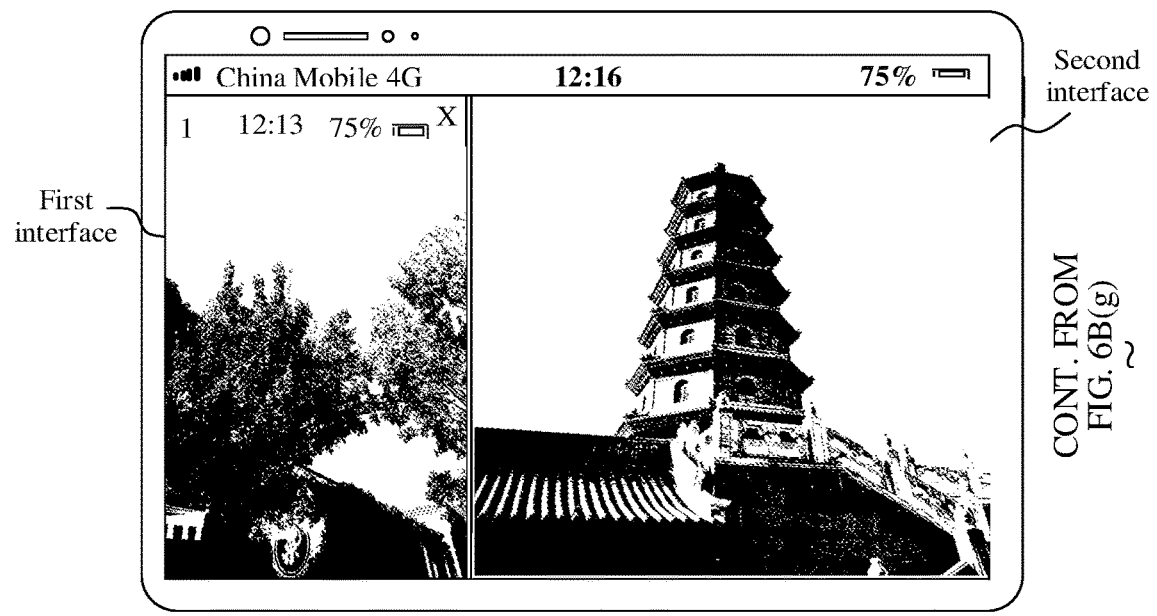

Then, the user may continue to slide the photo on the second interface, for example, as shown in FIG. 6B(e). When the user slides a page from right to left on the second interface, for example, slides to a next picture (referred to as a "photo 2" below), as shown in FIG. 6B(f), if the user wants to perform comparative browsing on the photo 2 and the photo 1, the user may tap the screenshot 1 on the first interface, for example, as shown in FIG. 6B(g). Then, the screenshot 1 tapped by the user may be displayed in full screen on the first interface, and the photo 2 is displayed on the second interface, for example, as shown in FIG. 6B(h).

In some embodiments of this application, on the first interface in FIG. 6A(d) and FIG. 6B(e) to FIG. 6B(h), there is a button "x" in an upper right corner of the displayed screenshot. The user may tap the button "x" to exit full screen or delete the screenshot. For example, in the schematic diagram shown in FIG. 6A(d), if the user taps "x", the screenshot may be deleted. If the user taps, in the schematic diagram shown in FIG. 6B(h), the screenshot 1 displayed in full screen on the first interface, full-screen display of the screenshot 1 may be exited. Certainly, it may be understood that, in full-screen display, the screenshot may also be zoomed in or zoomed out through a gesture operation.

In some other embodiments of this application, a label may be added to the screenshot displayed on the first interface, to distinguish between screenshots. For example, in the foregoing schematic diagram, a numeric label such as 1 or 2 is added to the upper left corner of the thumbnail, to distinguish between the screenshots. Certainly, a time label or the like may be added to an upper left corner of the screenshot, the added label may also be in another form, and a location of the label may also be another location. For example, a digital label may also be added to distinguish screenshots. This is not limited in this application.

It should be noted that the label added to the screenshot may be displayed or may not be displayed. This is not limited in this application. For example, when the label added to the screenshot is displayed, refer to the digital label 1 on the first interface shown in FIG. 6A(d).

In this embodiment of this application, the thumbnail may be directly displayed in the first area. In this way, content of the first area can be compared with content of the second area, and the user does not need to start two applications, so that operation steps are simplified.

Step 405: If the gesture operation of the user in the second area is a bottom-up slide operation, save key information of the second area, and display the key information of the second area in the first area. It should be noted that the key information of the second area may be understood as a plurality of patterns drawn by the user in the following embodiments.

Figure 7A:
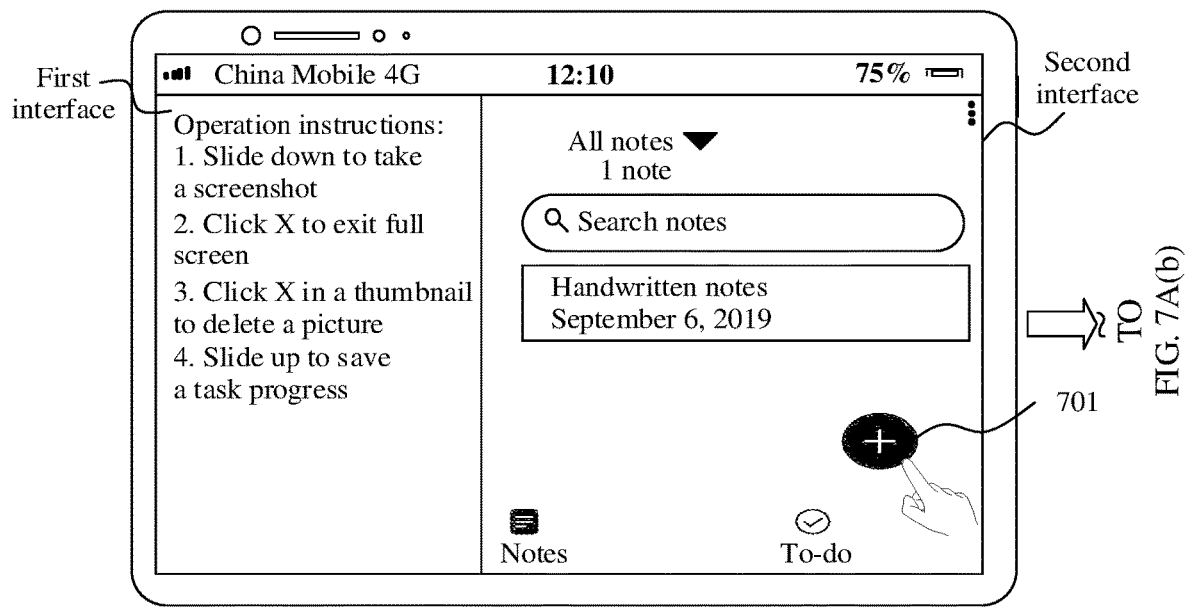
FIG. 7A(a) to FIG. 7A(d) to FIG. 7C(h2) to FIG. 7C(k) each are a schematic diagram of an interface of a mobile phone 100 according to an embodiment of this application.
Figure 7A:
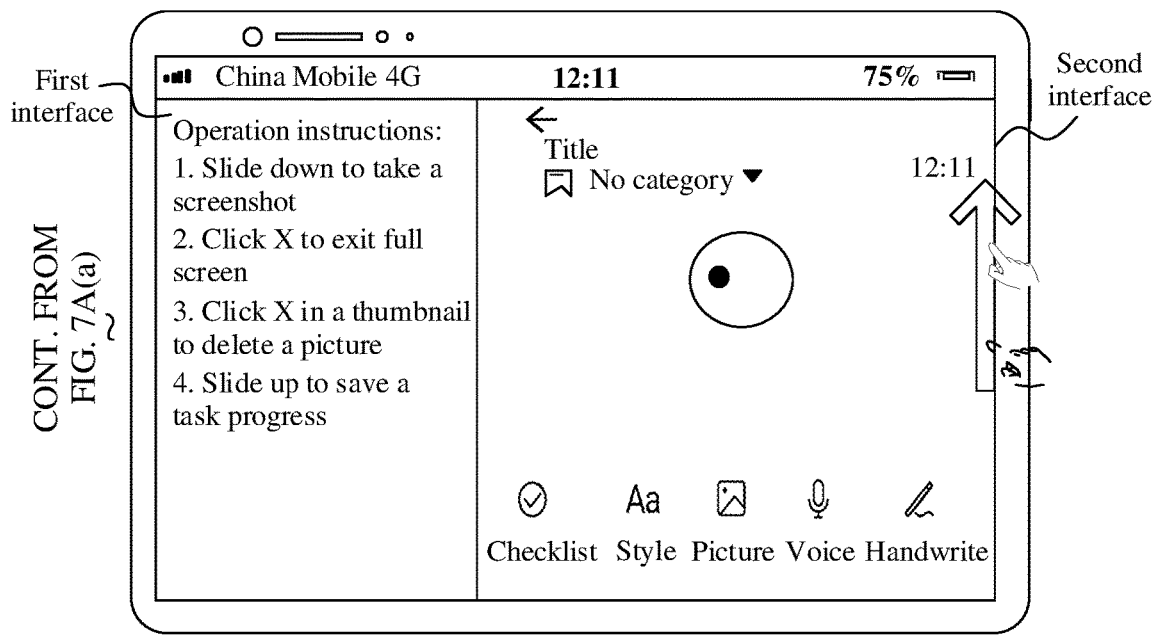
Figure 7A:
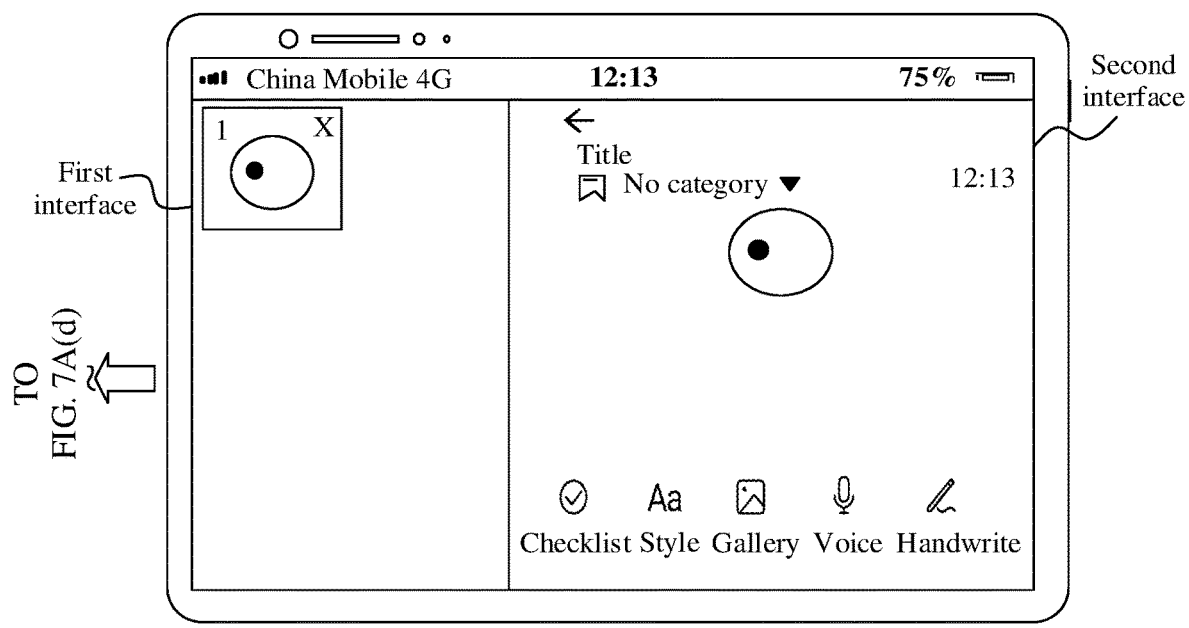
Figure 7A:
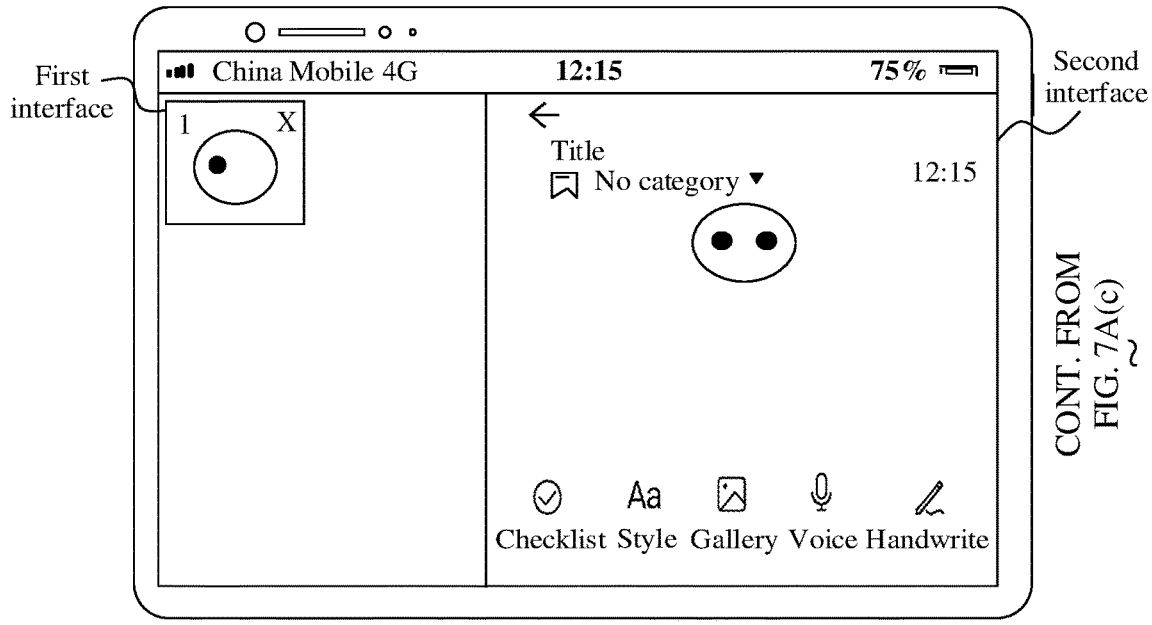

For example, the second area displays an interface before the user enables the mode. FIG. 7A(a) to FIG. 7A(d) are a schematic diagram of a group of interfaces according to an embodiment of this application. After the dual-screen linkage mode is enabled on the mobile phone 100, the display of the mobile phone 100 may display a first interface and a second interface, for example, as shown in FIG. 7A(a). The first interface displays the operation instruction of the dual-screen linkage mode, and the second interface displays the interface before the mode is enabled, for example, an interface of a drawing application.

When the user taps an "add" button 701 in the schematic diagram shown in FIG. 7A(a), the user may create a new draft. For example, in this case, the user may edit the new draft. It is assumed that the user draws a pattern (referred to as a "pattern 1" below) shown in FIG. 7A(b) in the new draft, if the user wants to save the current pattern 1 in this case, the user may perform a gesture operation based on the operation instruction in the dual-screen linkage mode, for example, as shown in FIG. 7A(b), a slide operation of sliding from bottom to top along a right edge of the display. After a sensor at a hardware layer of the mobile phone 100 detects the slide operation of sliding from bottom to top along the right edge of the display, a gesture recognition module recognizes that the slide operation of sliding from bottom to top along the right edge of the display is a gesture operation of saving a task progress. After monitoring the gesture operation, a system UI may obtain a current task progress in the second area, invoke a task management service of a framework layer, and then save the obtained current task progress (that is, a progress of the pattern 1 on the second interface) in the second area through an interface for saving an activity status in the task management service (for example, the saved progress of the pattern 1 may be recorded as a progress 1). Then the system UI may send the progress 1 to the first-area activity, for example, as shown in FIG. 7A(c).

It should be noted that saving the progress may be understood as saving operation steps of the user on an interface.

Figure 7B:
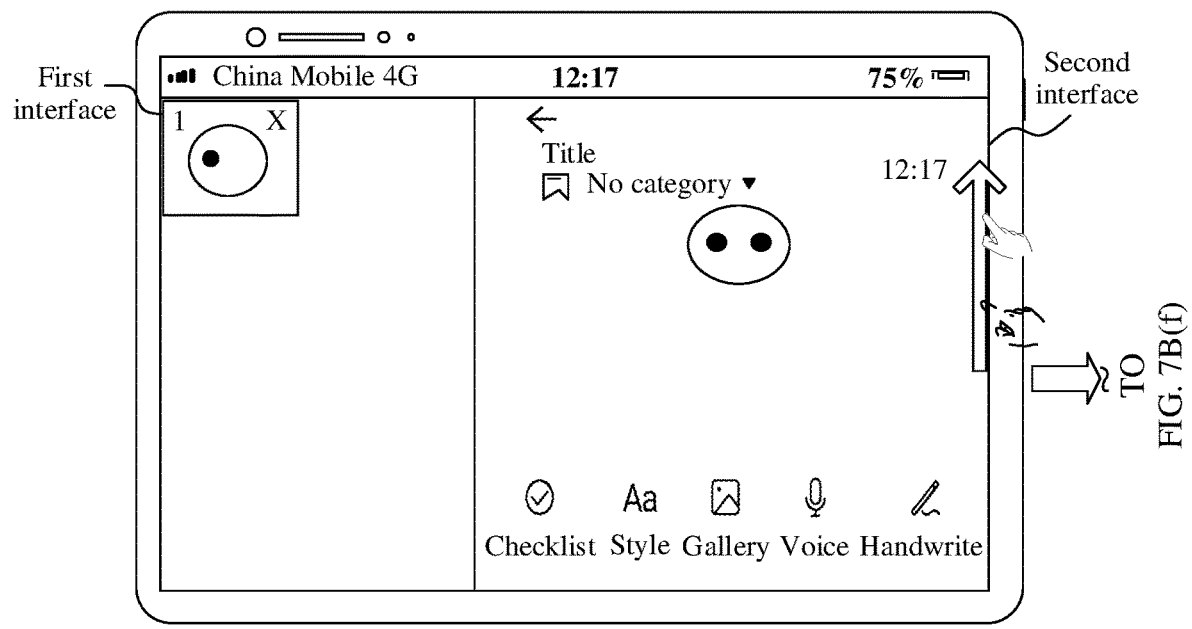
Figure 7B:
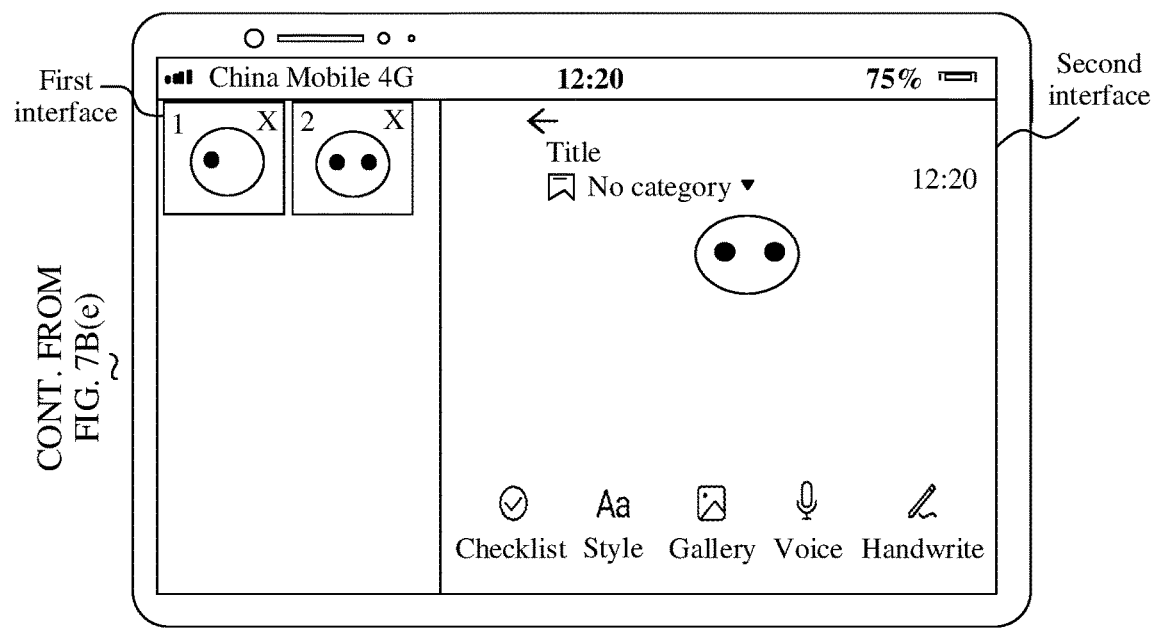
Figure 7B:
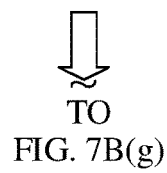

Then, the user may continue to perform a next operation on the second interface. It is assumed that the user continues to draw on the second interface to form an updated pattern, for example, a pattern 2 on the second interface shown in FIG. 7A(d). In this case, if the user wants to save a current progress (for example, denoted as a progress 2) of the pattern 2, the user may slide from bottom to top along the right edge of the display, for example, as shown in FIG. 7B(e), then, the gesture recognition module may recognize that the slide operation of sliding from bottom to top along the right edge of the display is a gesture operation of saving the task progress. After monitoring the gesture operation, the system UI may obtain a current task progress (that is, the progress 2) in the second area, invoke the task management service of the framework layer, and then save the obtained current task progress (that is, the progress 2) in the second area through the interface for saving the activity status in the task management service. Then the system UI may send the progress 2 to the first-area activity, for example, refer to the first interface shown in FIG. 7B(f). The user may continue to perform a next operation on the second interface, for example, an interface after the operation is shown in FIG. 7B(g).

Step 4051: Restore the content of the first area to display the content in the second area if the gesture operation of the user on the first area is a left-to-right slide operation.

Figure 7C:
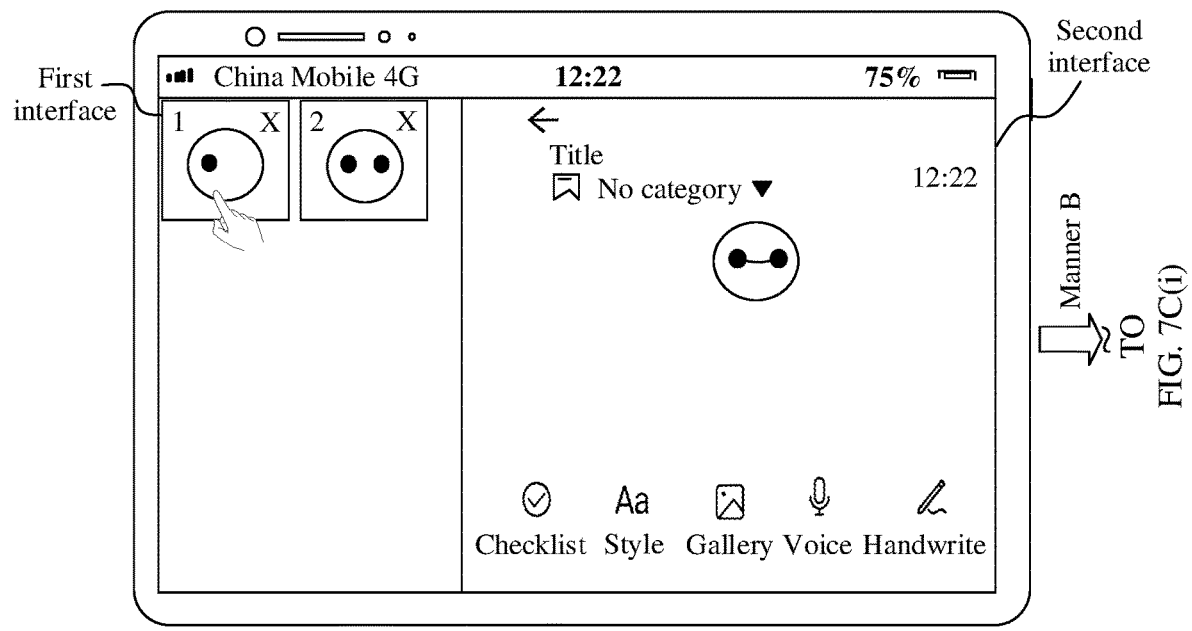
Figure 7C:
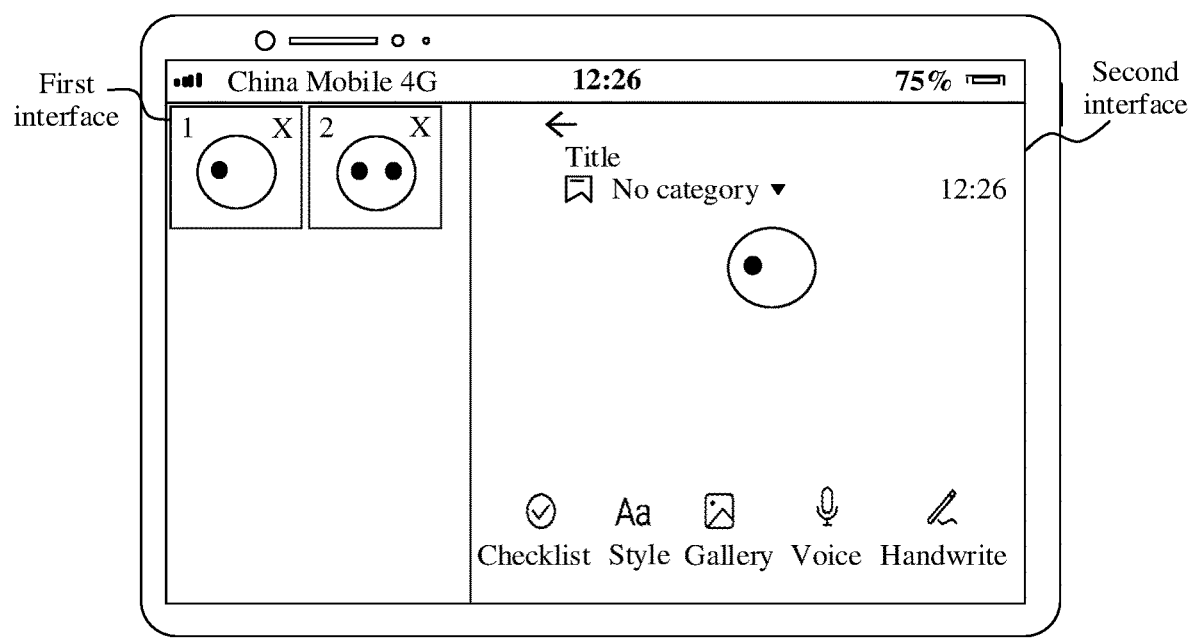

Then, when the user continues to operate on the second interface, if the user wants to restore to a previous step, for example, wants to restore to the progress 1, the following two manners may be used in this embodiment of this application:

Manner A: Refer to FIG. 7B(h1). The user may tap the progress 1 on the first interface, and slide the progress 1 from left to right. After the sensor of the mobile phone 100 detects the left-to-right slide operation performed by the user on the first interface, the gesture recognition module may recognize that the left-to-right slide operation is an operation of restoring the task progress. After monitoring the left-to-right slide operation, the system UI may invoke the task management service of the framework layer, and restore the progress 1 to the second interface through an interface for restoring the activity status, that is, an operation interface that displays the progress 1 on the second interface, for example, as shown in FIG. 7C(k) below.

Manner B: The user may tap the progress 1 on the first interface, as shown in FIG. 7C(h2), and then the progress 1 may be displayed in full screen on the first interface, as shown in FIG. 7C(i). In this case, the user slides the progress 1 from left to right on the first interface shown in FIG. 7C(i), and after the sensor of the mobile phone 100 detects the slide operation of the user from left to right on the first interface, the gesture recognition module may recognize that the left-to-right slide operation is an operation of restoring the task progress. After monitoring the left-to-right slide operation, the system UI may invoke the task management service of the framework layer, and restore the progress 1 to the second interface through an interface for restoring the activity status, namely, display an operation interface of the progress 1 on the second interface, that is, restore an operation interface of the progress 1 to display the operation interface on the second interface, for example, as shown in FIG. 7C(k).

It should be noted that, in this embodiment of this application, if the user wants to restore the previous progress, after the previous progress is restored, the previous progress may still be stored and displayed on the first interface (for example, may be saved on the first interface in a form of a copy). This can also facilitate a subsequent operation of the user. For example, after restoring the previous progress (for example, the progress 1), the user continues the operation. When the user wants to restart from the progress 1 in a step, the user may further restore the progress 1 to the second interface again.

In this application, by using the foregoing method, progress in an operation process of the user may be compared, and a previous step may be restored at anytime. This improves user experience.

To implement functions in the foregoing method provided in embodiments of this application, a mobile terminal device may include a hardware structure and/or a software module, and implement the foregoing functions in a form of the hardware structure, the software module, or a combination of the hardware structure and the software module. Whether a function in the foregoing functions is performed through the hardware structure, the software module, or the combination of the hardware structure and the software module depends on a particular application and a design constraint of the technical solution.

In the foregoing embodiments provided in this application, the method provided in embodiments of this application is described from a perspective of an electronic device serving as an execution body. To implement functions in the foregoing method provided in embodiments of this application, a terminal device may include a hardware structure and/or a software module, and implement the foregoing functions in a form of the hardware structure, the software module, or a combination of the hardware structure and the software module. Whether a function in the foregoing functions is performed through the hardware structure, the software module, or the combination of the hardware structure and the software module depends on a particular application and a design constraint of the technical solution.

Figure 8:
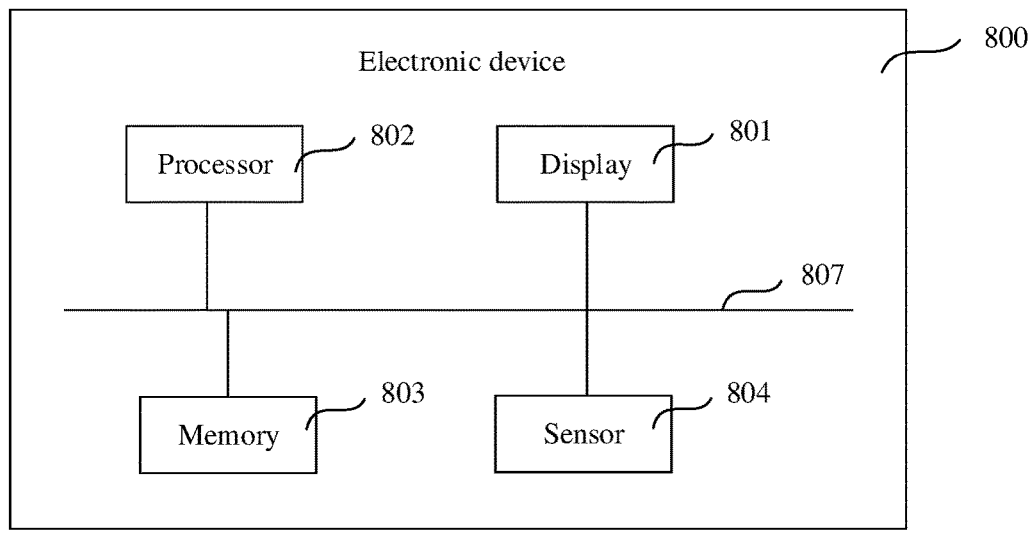
FIG. 8 is a schematic diagram of another electronic device according to an embodiment of this application.

As shown in FIG. 8, some other embodiments of this application disclose an electronic device. The electronic device may be an electronic device having a display. Refer to FIG. 8. The electronic device 800 includes a display 801, one or more processors 802, one or more memories 803, one or more sensors 804, a plurality of applications 805 (not shown in the figure), and one or more computer programs 806 (not shown in the figure). The foregoing components may be connected through one or more communication buses 807.

The display 801 is configured to display a home screen, or a display interface of an application in the electronic device, or an operation instruction of a dual-screen linkage mode. The memory 803 stores one or more computer programs. The one or more computer programs include instructions. The processor 802 invokes the instructions stored in the memory 803, so that the electronic device 800 performs the following steps: displaying, by the display 801, a first interface of a first application; detecting a first operation of a user; displaying, in response to the first operation, the first interface in a first area of the display 801, and displaying a second interface in a second area of the display 801; detecting a second operation of the user; and saving, in response to the second operation, a first image corresponding to the first interface, and displaying a thumbnail of the first image on the second interface.

In a possible implementation, a text description corresponding to the thumbnail of the first image is further displayed on the second interface.

In a possible implementation, when the instructions are invoked and executed by the one or more processors 802, the electronic device is enabled to further perform the following step: detecting a third operation performed on the thumbnail of the first image, and displaying the first image in the second area of the display 801.

In a possible implementation, the first image is an image saved when a user operation on the first interface reaches a first progress; and when the instructions are invoked and executed by the one or more processors 802, the electronic device is enabled to further perform the following step: saving, in response to the second operation, the first progress corresponding to the first image.

In a possible implementation, when the instructions are invoked and executed by the one or more processors 802, the electronic device is enabled to further perform the following step after displaying the first image in the second area: detecting a fourth operation performed on the first interface; displaying, in response to the fourth operation, a third interface in the first area of the display, where an image corresponding to the third interface is a second image, the second image is a corresponding image when the user operation on the first interface reaches a second progress, and the second progress is a progress after the first progress; detecting a fifth operation performed on the first image; and displaying, in response to the fifth operation, the first image in the first area of the display.

In a possible implementation, the first operation includes an operation of enabling a preset working mode from a notification bar of the display.

In a possible implementation, the second operation includes: a top-down slide operation in the first area, or a bottom-up slide operation in the first area.

In a possible implementation, the third operation includes a tap operation and a gesture extension operation.

In a possible implementation, the fifth operation includes a slide operation from the second area to the first area.

In a possible implementation, the second interface of the display 801 is further configured to display an operation instruction of a preset working mode, and the operation instruction of the preset working mode includes at least one of function descriptions corresponding to the first operation, the second operation, the third operation, and the fifth operation respectively.

In a possible implementation, when the display 801 is a foldable display, the first interface of the first application is displayed on a primary screen of the foldable display 801, and the second interface of a second application is displayed on a secondary screen of the foldable display.

In a possible implementation, when the instructions are invoked and executed by the one or more processors 802, the electronic device is enabled to further perform the following step after the in response to the first operation: displaying the first interface on the primary screen of the foldable display, and displaying the second interface and an operation instruction of a preset working mode on the secondary screen of the foldable display; or displaying the first interface and an operation instruction of a preset working mode on the primary screen of the foldable display, and displaying the second interface on the secondary screen of the foldable display; or displaying the first interface on the primary screen of the foldable display, and displaying an operation instruction of a preset working mode on the secondary screen of the foldable display; or displaying an operation instruction of a preset working mode on the primary screen of the foldable display, and displaying the second interface on the secondary screen of the foldable display.

In this embodiment of this application, the processor 802 may be a general purpose processor, a digital signal processor, an application-specific integrated circuit, a field programmable gate array or another programmable logic device, a discrete gate or a transistor logic device, or a discrete hardware component, so that the methods, steps, and logical block diagrams that are disclosed in embodiments of this application may be implemented or performed. The general purpose processor may be a microprocessor, any conventional processor, or the like. The steps of the methods disclosed with reference to embodiments of this application may be directly performed and completed by a hardware processor, or may be performed and completed by using a combination of hardware and software modules in the processor. The software module may be located in the memory 803. The processor 802 reads the program instructions from the memory 803, and completes the steps of the foregoing method in combination with the hardware of the processor.

In this embodiment of this application, the memory 803 may be a non-volatile memory such as a hard disk drive (HDD) or a solid-state drive (SSD), or may be a volatile memory such as a RAM. The memory may alternatively be any other medium that can be configured to carry or store expected program code in a form of an instruction or a data structure and that can be accessed by a computer. This is not limited thereto. The memory in this embodiment of this application may alternatively be a circuit or any other apparatus that can implement a storage function, and is configured to store instructions and/or data.

It may be clearly understood by a person skilled in the art that, for ease of convenience and brevity, for a detailed working process of the foregoing apparatus, and unit, refer to a corresponding process in the foregoing method embodiments. Details are not repeatedly described herein.

Based on the foregoing embodiments, this application further provides a computer storage medium. The computer storage medium stores a computer program. When the computer program is executed by a computer, the computer is enabled to perform the display method provided in the foregoing embodiments.

An embodiment of this application further provides a computer program product including instructions. When the computer program product is run on a computer, the computer is enabled to perform the display method provided in the foregoing embodiments.

Embodiments of this application are described with reference to the flowcharts and/or block diagrams of the method, the device (system), and the computer program product according to embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or any other programmable data processing device, so that a series of operations and steps are performed on the computer or any other programmable device, thereby generating computer-implemented processing. Therefore, the instructions executed on the computer or any other programmable device provide steps for implementing a specific function in one or more processes in the flowcharts and/or in one or more blocks in the block diagrams.

What is claimed is:

1. A method, applied to an electronic device having a display, the method comprising:
    displaying a first interface of a first application in a third area of the display;
    detecting a first operation of a user;
    displaying, in response to the first operation, the first interface in a first area of the display, and displaying a second interface in a second area of the display, wherein the third area is bigger than the first area;
    detecting a second operation of the user;
    saving, in response to the second operation, a first image that is a screenshot or key information of the first interface, and displaying a thumbnail representing the content of the first image on the second interface, wherein the first image is an image saved when a user operation on the first interface reaches a first progress;
    saving, in response to the second operation, the first progress corresponding to the first image;
    detecting a third operation performed on the thumbnail representing the content of the first image, and displaying the first image in the second area of the display;
    detecting a fourth operation performed on the first interface; and
    displaying, in response to the fourth operation, a third interface in the first area of the display, wherein an image corresponding to the third interface is a second image, and the second image is an image when the user operation on the first interface reaches a second progress, and the second progress is a progress after the first progress.

2. The method according to claim 1, wherein the second interface further displays a text description corresponding to the thumbnail representing the content of the first image.

3. The method according to claim 1, wherein after displaying the first image in the second area, the method further comprises:
    detecting a fifth operation performed on the first image; and
    displaying, in response to the fifth operation, the first image in the first area of the display.

4. The method according to claim 3, wherein the fifth operation comprises a slide operation from the second area to the first area.

5. The method according to claim 3, wherein the second interface is further configured to display an operation instruction of a preset working mode, and the operation instruction of the preset working mode comprises at least one of function descriptions corresponding to the first operation, the second operation, the third operation, or the fifth operation respectively.

6. The method according to claim 3, wherein the third operation comprises: a tap operation and a gesture extension operation.

7. The method according to claim 1, wherein the first operation comprises an operation of enabling a preset working mode from a notification bar of the display.

8. The method according to claim 1, wherein the second operation comprises: a top-down slide operation in the first area.

9. The method according to claim 1, wherein the second operation comprises: a bottom-up slide operation in the first area.

10. The method according to claim 9, wherein when the display is a foldable display, the first interface of the first application is displayed on a primary screen of the foldable display, and the second interface of a second application is displayed on a secondary screen of the foldable display.

11. The method according to claim 9, wherein the display is a foldable display, and the method comprises:
    in response to the first operation, displaying the first interface on a primary screen of the foldable display, and displaying the second interface and an operation instruction of a preset working mode on a secondary screen of the foldable display.

12. The method according to claim 9, wherein the display is a foldable display, and the method comprises:
    in response to the first operation, displaying the first interface and an operation instruction of a preset working mode on a primary screen of the foldable display, and displaying the second interface on a secondary screen of the foldable display.

13. The method according to claim 9, wherein the display is a foldable display, and the method comprises:
    in response to the first operation, displaying the first interface on a primary screen of the foldable display, and displaying an operation instruction of a preset working mode on a secondary screen of the foldable display.

14. The method according to claim 9, wherein the display is a foldable display, and the method comprises:
    in response to the first operation, displaying an operation instruction of a preset working mode on a primary screen of the foldable display, and displaying the second interface on a secondary screen of the foldable display.

15. The method according to claim 1, wherein the third area is a full screen of the display.

16. An electronic device, comprising:
    at least one processor; and
    a non-transitory computer readable medium which contains computer-executable instructions;
    wherein the at least one processor is configured to execute the computer-executable instructions to enable the electronic device to perform operations comprising:
    displaying a first interface of a first application on a display;
    detecting a first operation of a user;
    displaying, in response to the first operation, the first interface in a first area of the display, and displaying a second interface in a second area of the display;
    detecting a second operation of the user;
    saving, in response to the second operation, a first image that is a screenshot or key information of the first interface, and displaying a thumbnail representing the content of the first image on the second interface, wherein the first image is an image saved when a user operation on the first interface reaches a first progress;
    saving, in response to the second operation, the first progress corresponding to the first image;
    detecting a third operation performed on the thumbnail representing the content of the first image, and displaying the first image in the second area of the display;
    detecting a fourth operation performed on the first interface; and
    displaying, in response to the fourth operation, a third interface in the first area of the display, wherein an image corresponding to the third interface is a second image, and the second image is an image when the user operation on the first interface reaches a second progress, and the second progress is a progress after the first progress.

17. The electronic device according to claim 16, wherein the second interface further displays a text description corresponding to the thumbnail representing the content of the first image.

18. A non-transitory computer-readable storage medium, wherein the computer-readable storage medium stores instructions, and when the instructions are run on an electronic device, the electronic device is enabled to perform operations comprising:
    displaying a first interface of a first application on a display;
    detecting a first operation of a user;
    displaying, in response to the first operation, the first interface in a first area of the display, and displaying a second interface in a second area of the display;
    detecting a second operation of the user;
    saving, in response to the second operation, a first image that is a screenshot or key information of the first interface, and displaying a thumbnail representing the content of the first image on the second interface, wherein the first image is an image saved when a user operation on the first interface reaches a first progress;
    saving, in response to the second operation, the first progress corresponding to the first image;
    detecting a third operation performed on the thumbnail representing the content of the first image, and displaying the first image in the second area of the display;
    detecting a fourth operation performed on the first interface; and
    displaying, in response to the fourth operation, a third interface in the first area of the display, wherein an image corresponding to the third interface is a second image, and the second image is an image when the user operation on the first interface reaches a second progress, and the second progress is a progress after the first progress.

19. The computer-readable storage medium according to claim 18, wherein the second interface further displays a text description corresponding to the thumbnail representing the content of the first image.

20. The electronic device according to claim 16, wherein when the display is a foldable display, the first interface of the first application is displayed on a primary screen of the foldable display, and the second interface of a second application is displayed on a secondary screen of the foldable display.

* * * * *